(12) United States Patent
Jang

(10) Patent No.: US 12,375,822 B2
(45) Date of Patent: Jul. 29, 2025

(54) METHOD OF BINNING IMAGE SENSOR, AND IMAGE SENSOR PERFORMING THE SAME

(71) Applicant: SAMSUNG ELECTRONICS CO., LTD., Suwon-si (KR)

(72) Inventor: Chanyoung Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 343 days.

(21) Appl. No.: 18/093,531

(22) Filed: Jan. 5, 2023

(65) Prior Publication Data
US 2023/0353891 A1  Nov. 2, 2023

(30) Foreign Application Priority Data
Apr. 27, 2022  (KR) .................. 10-2022-0052268

(51) Int. Cl.
| | |
|---|---|
| *H04N 25/46* | (2023.01) |
| *H04N 23/84* | (2023.01) |
| *H04N 25/702* | (2023.01) |

(52) U.S. Cl.
CPC .......... *H04N 25/46* (2023.01); *H04N 23/843* (2023.01); *H04N 25/702* (2023.01)

(58) Field of Classification Search
CPC .... H04N 25/46; H04N 23/843; H04N 25/702; H04N 25/134; H04N 25/70; H04N 25/447
USPC ........................................ 348/302
See application file for complete search history.

(56) References Cited

U.S. PATENT DOCUMENTS

| | | | |
|---|---|---|---|
| 7,154,075 B2 | 12/2006 | Krymski | |
| 7,417,670 B1 | 8/2008 | Linzer et al. | |
| 7,929,807 B2* | 4/2011 | Andersen | H04N 23/843 |
| | | | 382/163 |
| 8,306,362 B2 | 11/2012 | Compton | |
| 8,780,238 B2 | 7/2014 | Bowers | |
| 9,001,233 B2 | 4/2015 | Kasai | |
| 9,137,452 B2 | 9/2015 | Han | |
| 9,584,742 B2 | 2/2017 | Park et al. | |
| 11,082,643 B2 | 8/2021 | Dharia et al. | |
| 11,178,372 B1 | 11/2021 | Jang et al. | |
| 2010/0231765 A1 | 9/2010 | Kefeder | |
| 2011/0063473 A1* | 3/2011 | Tsunekawa | H04N 25/76 |
| | | | 348/222.1 |
| 2011/0102646 A1* | 5/2011 | Minagawa | H04N 25/134 |
| | | | 348/E9.037 |
| 2015/0070550 A1 | 3/2015 | Shi | |
| 2015/0350575 A1* | 12/2015 | Agranov | H04N 25/78 |
| | | | 348/302 |

* cited by examiner

*Primary Examiner* — Lin Ye
*Assistant Examiner* — Chan T Nguyen
(74) *Attorney, Agent, or Firm* — Sughrue Mion, PLLC

(57) ABSTRACT

Disclosed is a method of binning an image sensor, which includes outputting analog pixel signals by performing binning on a pixel array including a plurality of pixels having a first matrix shape and arranged in a row direction and a column direction repeatedly at a first interval, outputting binning image data including binning sampling signals having a second matrix shape, in which the first matrix shape is rotated by a given angle, and arranged repeatedly at a second interval different from the first interval, based on the analog pixel signals, and outputting Bayer pattern image data having the first matrix shape, based on the binning image data.

20 Claims, 26 Drawing Sheets

FIG. 6

PTR1

FIG. 11

PTR2

METHOD OF BINNING IMAGE SENSOR, AND IMAGE SENSOR PERFORMING THE SAME

CROSS-REFERENCE TO RELATED APPLICATION

This application claims priority from Korean Patent Application No. 10-2022-0052268 filed on Apr. 27, 2022, in the Korean Intellectual Property Office, the disclosure of which is incorporated herein by reference in its entirety.

BACKGROUND

1. Field

Embodiments of the disclosure described herein relate to a semiconductor device, and more particularly, relate to a method of binning an image sensor and an image sensor performing the method.

2. Description of Related Art

An image sensor converts a light incident through a camera lens into digital data. With the development of semiconductor technologies, the bandwidth and power consumption increase to transfer high-definition digital image data. To address this issue, binning (alternatively called "image binning" or "pixel binning") is used to reduce magnitudes of various signal and data, which a pixel array of an image sensor generates, while maintaining the field of view of the camera lens.

However, in the case of using the binning, for example, analog binning, a jagging artifact occurs due to non-uniform binning sampling signals, or a plurality of false colors occur due to the difference between the pattern and shape of binning sampling signals and the uniform pattern and shape that pixels of the pixel array have.

SUMMARY

Embodiments of the disclosure provide a method of binning an image sensor capable of improving a quality of digital image data by preventing occurrence of a jagging artifact and reducing the number of false colors.

Embodiments of the disclosure also provide an image sensor capable of performing the method.

According to an embodiment, a method of binning an image sensor may include: outputting analog pixel signals by performing binning on a pixel array including a plurality of pixels having a first matrix shape and arranged in a row direction and a column direction repeatedly at a first interval; outputting binning image data including binning sampling signals having a second matrix shape in which the first matrix shape is rotated by a given angle, and arranged repeatedly at a second interval different from the first interval, based on the analog pixel signals; and outputting Bayer pattern image data having the first matrix shape, based on the binning image data.

According to an embodiment, an image sensor may include a pixel array, a counter block, a digital signal processing circuit, and a control circuit. The pixel array may include a plurality of pixels having a first matrix shape and arranged in a row direction and a column direction repeatedly at a first interval and outputs analog image data including analog pixel signals by performing binning on the plurality of pixels based on a first control signal. The counter block may output binning image data including binning sampling signals having a second matrix shape, in which the first matrix shape is rotated by a given angle, and arranged repeatedly at a second interval different from the first interval, based on a second control signal and the analog pixel signals. The digital signal processing circuit may output Bayer pattern image data having the first matrix shape based on a third control signal and the binning image data. The control circuit generates the first control signal, the second control signal, and the third control signal.

According to an embodiment, a method of binning an image sensor may include: outputting analog image data including analog pixel signals by performing binning on a pixel array including a plurality of pixels having a first matrix shape and arranged in a row direction and a column direction repeatedly at a first interval; outputting binning image data including binning sampling signals having a second matrix shape, in which the first matrix shape is rotated by a given angle, and arranged repeatedly at a second interval different from the first interval, based on the analog pixel signals; and outputting Bayer pattern image data having the first matrix shape, based on the binning image data. The outputting the analog image data may include activating a k-th row (k being an integer of 2 or more), a (k+2)-th row, a j-th column (j being an integer of 2 or more), and a (j+2)-th column of the pixel array to generate a first analog pixel signal. The outputting the binning image data may include generating a first binning sampling signal disposed at a (k+1)-th row and a (j+1)-th column of the binning image data, based on the first analog pixel signal. The second matrix shape may include a shape in which the first matrix shape is rotated clockwise by $\tan^{-1}(1/2)$.

BRIEF DESCRIPTION OF DRAWINGS

The above and other objects and features of the disclosure will become apparent by describing in detail embodiments thereof with reference to the accompanying drawings.

FIG. 6 is a diagram for describing a first pattern in which pixels included in a pixel array of FIG. 2 are arranged, according to an embodiment.

FIG. 11 is a diagram for describing a second pattern in which pixels included in a pixel array of FIG. 2 are arranged, according to an embodiment.

DETAILED DESCRIPTION

Below, embodiments of the disclosure will be described in detail and clearly to such an extent that one skilled in the art easily carries out the embodiments.

Figure 1:
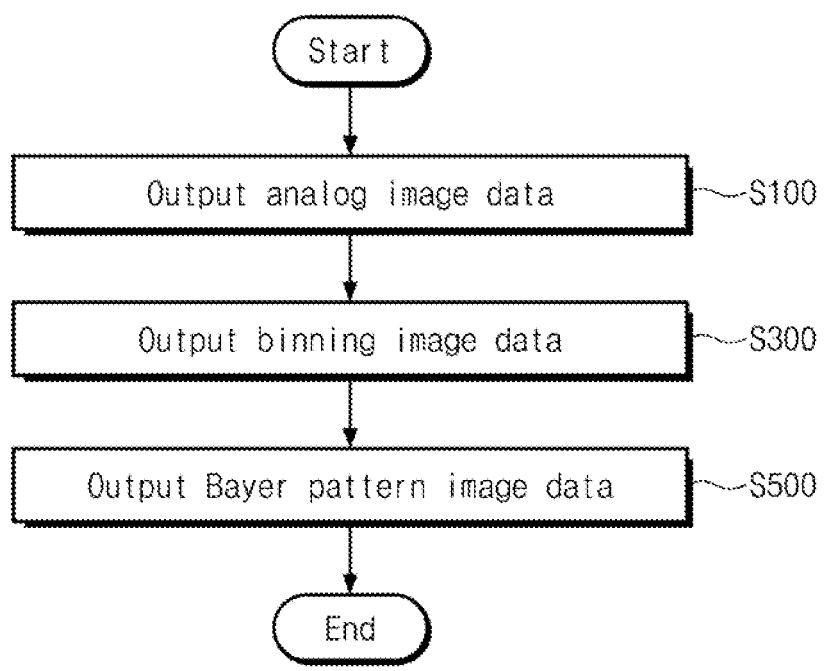
FIG. 1 is a flowchart illustrating a method of binning an image sensor according to an embodiment.

FIG. 1 is a flowchart illustrating a method of binning an image sensor, according to an embodiment.

Referring to FIG. 1, the method of binning the image sensor according to an embodiment may be performed by the image sensor. The image sensor senses a light incident through a camera lens and generates image data based on a result of photoelectric conversion of the sensed light. According to an embodiment, the method of binning the images sensor may be performed by using both analog circuits and digital circuits included in the image sensor, but the present disclosure is not limited thereto. In an embodiment, the method of binning the image sensor may be performed by using the digital circuits, among the analog circuit and the digital circuit, included in the image sensor. The analog circuits and the digital circuits of the image sensor will be described in detail with reference to FIG. 2.

In the method of binning the image sensor according to an embodiment, analog image data are output (S100).

According to an embodiment, the analog image data may include analog pixel signals. The analog pixel signals may be generated by performing binning on a pixel array of the image sensor. The pixel array may include a plurality of pixels, and the binning may be performed by activating nearby pixels, for example, simultaneously activating, among the plurality of pixels, and converting charges stored in the nearby pixels into a corresponding analog voltage. In the process of performing the binning, columns corresponding to the activated pixels may be electrically connected with each other by one or more switches, and the analog voltage may be input to one corresponding correlated double sampling (CDS) circuit. Through the binning, magnitudes of various signals and data that the pixel array of the image sensor generates may decrease while maintaining the field of view the camera lens.

According to an embodiment, the plurality of pixels may be arranged in the pixel array repeatedly with a uniform shape and at a regular interval. For example, the plurality of pixels may have a first matrix shape, and may be arranged repeatedly in row and column directions at a first interval. The shape of the plurality of pixels and the pattern and interval associated with the arrangement of the plurality of pixels will be described in detail with reference to FIGS. 6 and 11.

Binning image data are output (S300).

According to an embodiment, binning image data may include binning sampling signals. The binning sampling signals may be generated based on the analog pixel signals.

According to an embodiment, the binning sampling signals may be included in the binning image data, and may be arranged repeatedly with a uniform shape and at a regular interval. For example, the binning sampling signals may have a second matrix shape obtained by rotating the first matrix shape by a given angle, and may be arranged repeatedly at a second interval, different from the first interval, in the binning image data. Herein, an expression "the binning sampling signals are arranged in the binning image data" may mean that the binning sampling signals are stored at specific locations of the binning image data to correspond to the analog pixel signals. The shape of the binning sampling signals and the pattern and interval associated with the arrangement of the binning sampling signals will be described in detail with reference to FIG. 7.

Bayer pattern image data are output (S500).

According to an embodiment, Bayer pattern image data may be generated based on the binning image data.

According to an embodiment, the Bayer pattern image data may include digital values, and the digital values may have the first matrix shape, that is, the shape identical to the shape of the plurality of pixels included in the pixel array, and may have the same pattern as the plurality of pixels.

According to an embodiment, the Bayer pattern image data may be final data that are obtained by performing the method of binning the image sensor according to an embodiment. The Bayer pattern image data may be provided to an application processor (e.g., 1200 of FIG. 18) so that digital image processing operations may be additionally performed.

When the binning is performed on the pixel array of the image sensor, the plurality of pixels may be classified into a plurality of pixel groups so as not to be duplicated, and the binning may be sequentially performed on the plurality of sub pixel groups included in one pixel group. According to an embodiment, the plurality of sub pixel groups may be generated in the same manner for each pixel group, and the binning may be performed in the same manner for each pixel group. Accordingly, each pixel group may be referred to as a "unit pixel group" for performing the binning. For example, the size of the unit pixel group may be 10×10.

The binning sampling signals respectively correspond to a plurality of sub pixel groups in a pixel group, and the binning sampling signals may be uniformly arranged in the same pattern as pixels in the pixel group, except that binning sampling signals are different in shape and interval from the pixels. According to this configuration, it may be possible to prevent the occurrence of the jagging artifact and to decrease the number of false colors, in the Bayer pattern image data (or image data generated after the additional digital processing).

The method of binning the image sensor according to embodiments may effectively improve a quality of digital image data that the image sensor generates by removing occurrence of a jagging artifact and decreasing the number of false colors in the digital image data.

Figure 2:
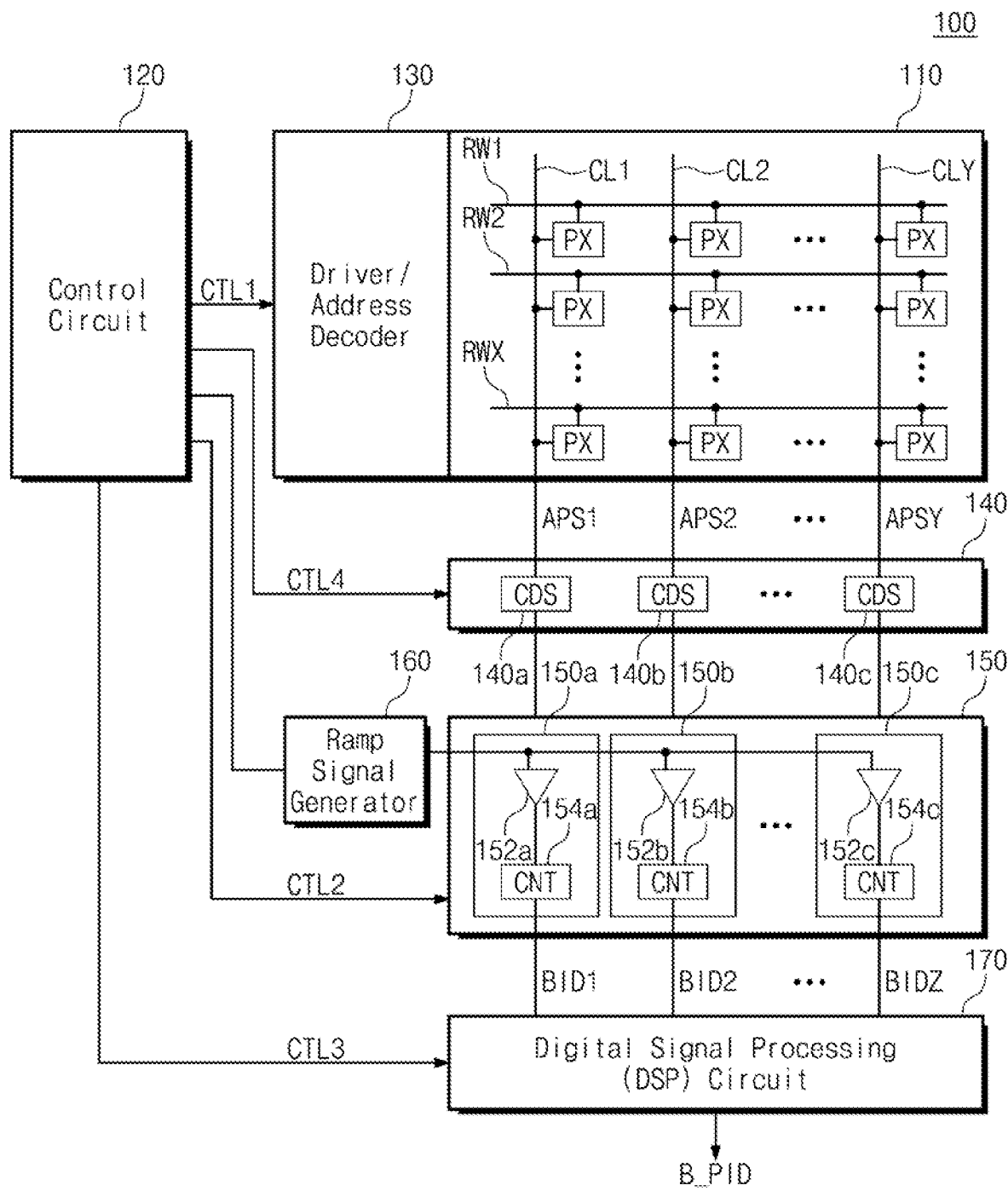
FIG. 2 is a block diagram illustrating an image sensor, according to an embodiment.

FIG. 2 is a block diagram illustrating an image sensor, according to an embodiment.

Referring to FIG. 2, an image sensor 100 may include a pixel array 110, a CDS block 140, a counter block 150, a ramp signal generator 160, a driver/address decoder 130, and a control circuit 120. The image sensor 100 may further include or may be connected to a digital signal processing circuit 170.

The pixel array 110 may include a plurality of pixels PX. The plurality of pixels PX may have a matrix shape, and may be arranged repeatedly in row and column directions at a given interval. Each of the plurality of pixels PX may be connected with one of a plurality of rows RW1, RW2, ..., RWX and one of a plurality of columns CL1, CL2, ..., CLY. The pixel array 110 may sense a light incident through a camera lens depending on a shutter operation, may generate photo charges through photoelectric conversion, and may output analog pixel signals based on the photo charges.

The CDS block 140 may include a plurality of CDS circuits 140a, 140b, and 140c. The plurality of CDS circuits 140a, 140b, and 140c may be respectively connected with the plurality of columns CL1, CL2, ..., CLY of the pixel array 110, and may perform a CDS operation on the analog pixel signals output from the pixel array 110.

According to an embodiment, the CDS block 140 may further include a plurality of switches that selectively connect the plurality of columns CL1 to CLY of the pixel array 110. According to an embodiment, all the CDS circuits 140a, 140b, and 140c may not be activated, but only CDS circuits corresponding to each pixel group where the binning is performed may be sequentially activated. According to an embodiment, the plurality of switches may be included in the pixel array 110.

The counter block 150 may include a plurality of buffer circuits 152a, 152b, and 152c and a plurality of counter circuits 154a, 154b, and 154c. The plurality of buffer circuits 152a, 152b, and 152c and the plurality of counter circuits 154a, 154b, and 154c may be connected with the plurality of columns CL1 to CLY of the pixel array 110 through the CDS block 140, respectively, may count the analog pixel signals one which the CDS operation is performed at the CDS block 140 after being output from the pixel array 110, for example, in parallel, at the same time, and may convert counting result values into a plurality of digital signals.

According to an embodiment, operations of the CDS block 140 and the counter block 150 may be performed for each pixel group or for each sub pixel group as described with reference to FIG. 1.

The ramp signal generator 160 may include current sources, resistors, and capacitors. The current sources may generate currents of various levels, and the resistors and the capacitors may generate a ramp signal, that increases or decreases with a preset slope, based on the currents.

The digital signal processing circuit 170 may output digital image data by performing a plurality of digital signal processing operations, which are based on various algorithms, with respect to the plurality of digital signals from the counter block 150. According to an embodiment, the plurality of digital signal processing operations may be performed by an image signal processor or an application processor that may be included in digital signal processing circuit.

The driver/address decoder 130 may be connected with the plurality of rows RW1 to RWX and the plurality of columns CL1 to CLY of the pixel array 110, and may drive the plurality of pixels PX by activating the plurality of rows RW1 to RWX and the plurality of columns CL1 to CLY.

According to an embodiment, the driver/address decoder 130 may perform the binning for each sub pixel group by simultaneously driving pixels, which have the same color and are included in one sub pixel group belonging to one pixel group, from among the plurality of pixels PX.

The control circuit 120 may generate control signals CTL1, CTL2, CTL3, and CTL4, and may overall control the components 110, 130, 140, 150, 160, and 170 included in the image sensor 100. For example, the control circuit 120 may control the generation of the analog pixel signals to be output from the pixel array 110 according to the first control signal CTL1, may control the generation of the plurality of digital signals to be output from the counter block 150 according to the second control signal CTL2, may control the generation of the digital image data to be output from the digital signal processing circuit 170 according to the third control signal CTL3, and may connect some of the plurality of switches included in the CDS block 140 according to the fourth control signal CTL4.

According to an embodiment, referring to FIGS. 1 and 2, operation S100 may be performed by the pixel array 110 (or the pixel array 110 and the CDS block 140), operation S300 may be performed by the counter block 150, and operation S500 may be performed by the digital signal processing circuit 170. Accordingly, the analog pixel signals output from the pixel array 110 may be the analog pixel signals of FIG. 1, the plurality of digital signals output from the counter block 150 may be the binning sampling signals of FIG. 1, and the digital image data output from the digital signal processing circuit 170 may be the Bayer pattern image data of FIG. 1.

FIGS. 3A, 3B, 3C, and 3D are circuit diagrams illustrating examples of a pixel of a pixel array of FIG. 2, according to embodiments. Each pixel shown in FIGS. 3A, 3B, 3C, and 3D may correspond to the pixel PX shown in FIG. 2.

Figure 3A:
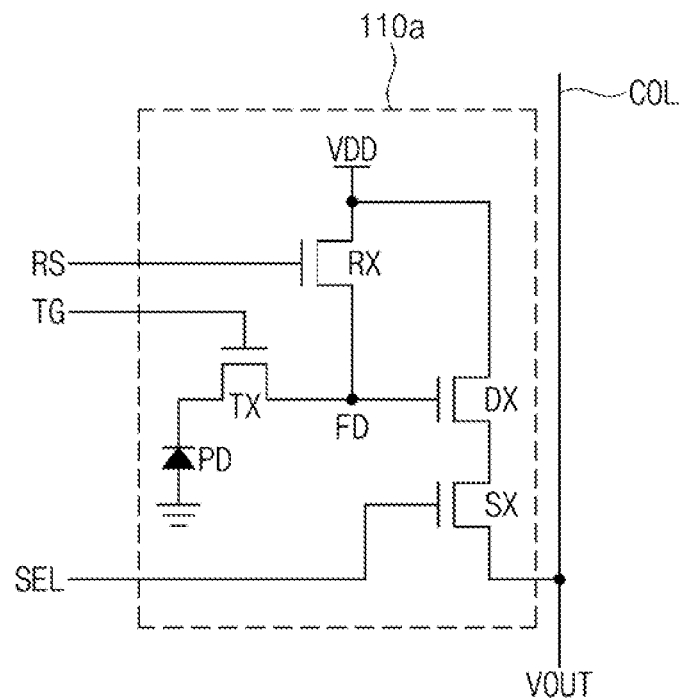
FIGS. 3A, 3B, 3C, and 3D are circuit diagrams illustrating examples of a pixel of a pixel array of FIG. 2, according to an embodiment.

Referring to FIG. 3A, a pixel 110a may include a photodiode PD as a photo sensitive device, and may include a transfer transistor TX, a reset transistor RX, a drive transistor DX, and a select transistor SX as a readout circuit for reading out an analog pixel signal.

For example, the photodiode PD may include an n-type region formed in a p-type substrate, and the p-type substrate and the n-type region may form a p-n junction photodiode. The photodiode PD may receive a light incident from the outside, and may generate photo charges based on the received light.

The photo charges generated by the photodiode PD may be transferred to a floating diffusion node FD through the transfer transistor TX. For example, when a transfer control signal TG has a first level (e.g., a high level), the transfer transistor TX may be turned on, and thus, the photo charges generated by the photodiode PD may be transferred to the floating diffusion node FD through the transfer transistor TX.

The drive transistor DX may operate as a source follower buffer amplifier, and may amplify a signal corresponding to charges integrated at the floating diffusion node FD. The select transistor SX may transfer the amplified signal to a column line COL in response to a selection signal SEL.

The floating diffusion node FD may be reset by the reset transistor RX. For example, for the CDS operation, the reset transistor RX may periodically discharge photo charges present at the floating diffusion node FD in response to a reset signal RS.

An example of the pixel including one photodiode PD and four transistors TX, RX, DX, and SX is illustrated in FIG. 3A, but the present disclosure is not limited thereto. Other examples of the unit pixel are illustrated in FIGS. 3B to 3D.

Figure 3B:
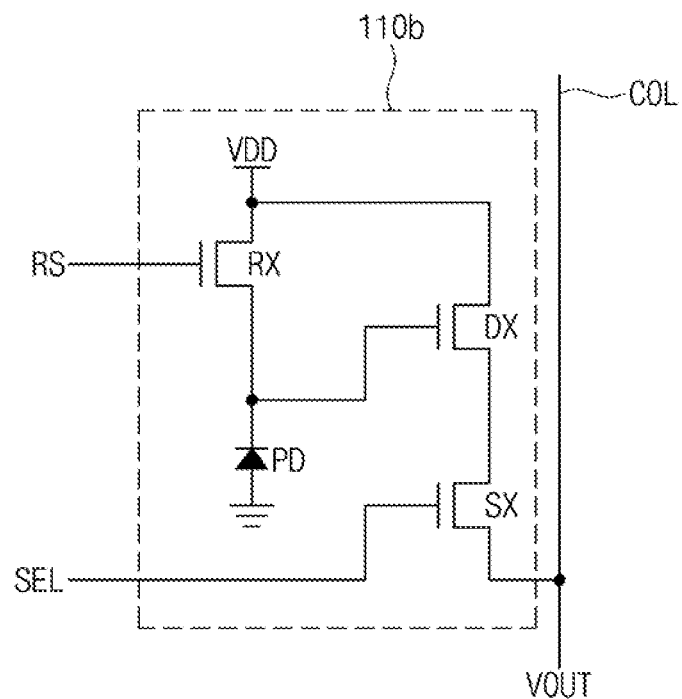

Referring to FIG. 3B, a pixel 110b may include the photodiode PD as the photo sensitive device, and may include the reset transistor RX, the drive transistor DX, and the select transistor SX as the readout circuit. That is, the pixel 110b may have a 3-transistor structure.

Figure 3C:
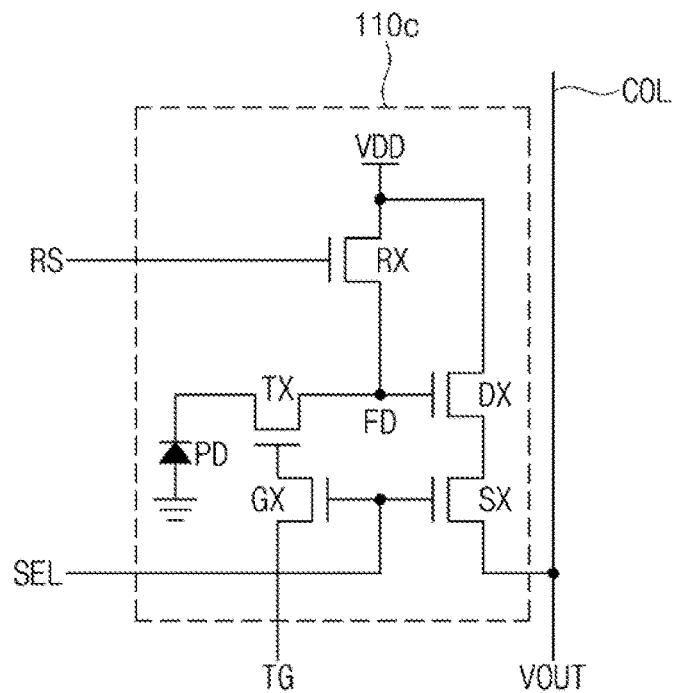

Referring to FIG. 3C, a pixel 110c may include the photodiode PD as the photo sensitive device, and may include the transfer transistor TX, a gate transistor GX, the reset transistor RX, the drive transistor DX, and the select transistor SX as the readout circuit. That is, the pixel 110c may have a 5-transistor structure. The gate transistor GX may selectively provide the transfer control signal TG to the transfer transistor TX in response to the selection signal SEL.

Figure 3D:
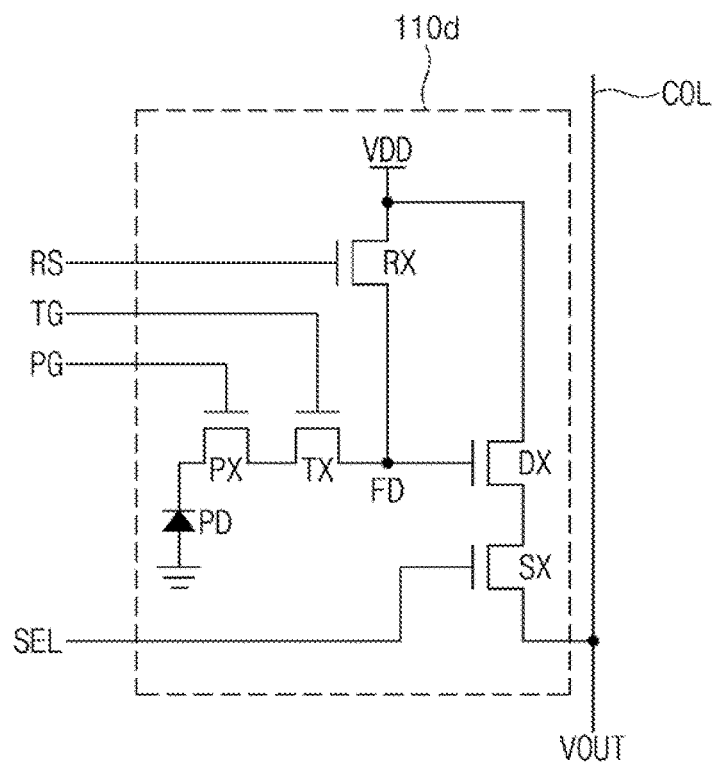

Referring to FIG. 3D, a pixel 110d may include the photodiode PD as the photo sensitive device, and may include a photo transistor (or a photo gate) PX, the transfer transistor TX, the reset transistor RX, the drive transistor DX, and the select transistor SX as the readout circuit. That is, the pixel 110d may have a 5-transistor structure. The photo transistor PX may be turned on/off in response to a photo gate signal PG. When the photo transistor PX is turned on, the photodiode PD may sense an incident light to generate photo charges. When the photo transistor PX is turned off, the photodiode PD may not sense an incident light.

Figure 4:
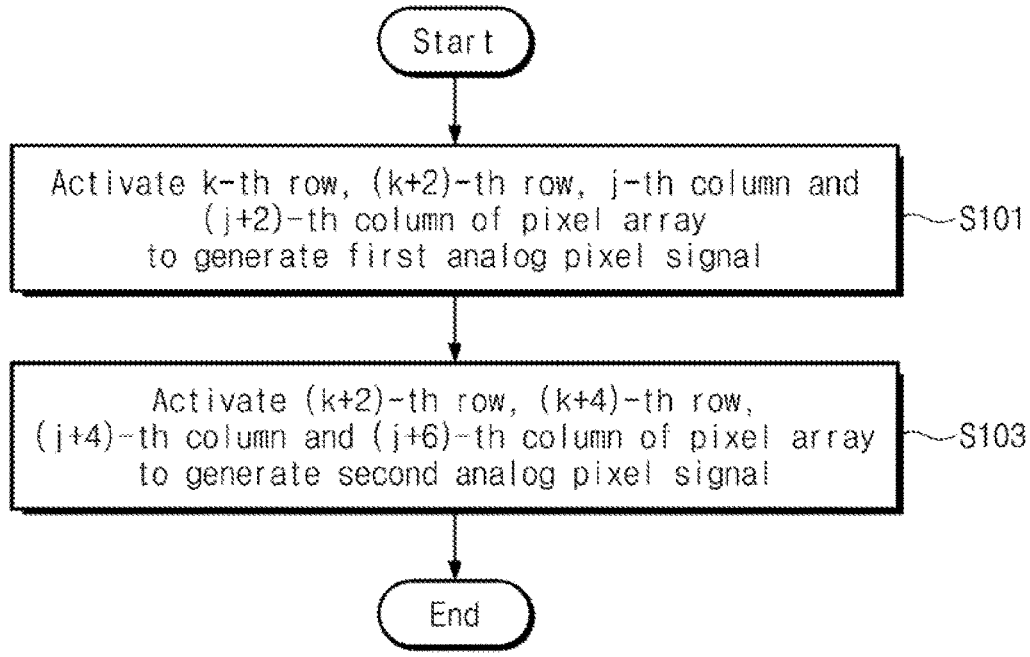
FIG. 4 is a flowchart illustrating an example of outputting analog image data corresponding to an operation S100 shown in FIG. 1.

FIG. 4 is a flowchart illustrating an example of outputting analog image data corresponding to an operation S100 shown in FIG. 1.

Referring to FIG. 4, in outputting of analog image data, a first analog pixel signal is generated (S101), and a second analog pixel signal is generated (S103).

According to an embodiment, the first analog pixel signal may be generated by simultaneously activating a k-th row (k being an integer of 2 or more), a (k+2)-th row, a j-th column (j being an integer of 2 or more), and a (j+2)-th column of the pixel array 110 described with reference to FIGS. 1 and 2. In this case, an analog signal corresponding to all photo charges integrated by photodiodes of pixels disposed at (k, j), ((k+2), j), (k, (j+2)), and ((k+2), (j+2)) of the pixel array 110 may be output as the first analog pixel signal. Herein, (k, j) means the k-th row and j-th column of the pixel array 110.

According to an embodiment, the second analog pixel signal may be generated by simultaneously activating the (k+2)-th row, a (k+4)-th row, a (j+4)-th column, and a (j+6)-th column of the pixel array 110. In this case, as in the first analog pixel signal, an analog signal corresponding to all photo charges integrated by photodiodes of pixels disposed at ((k+2), (j+4)), ((k+4), (j+4)), ((k+2), (j+6)), and ((k+4), (j+6)) of the pixel array 110 may be output as the second analog pixel signal.

According to an embodiment, the pixel array 110 may include the plurality of pixels PX, and the plurality of pixels PX may include green pixels, red pixels, and blue pixels arranged in an RGB Bayer pattern. In this case, the first and second analog pixel signals output in operation S101 and operation S103 may correspond to the green pixels.

According to an embodiment, the plurality of pixels PX may include green pixels, red pixels, blue pixels, and white pixels arranged in the RGBW non-Bayer pattern. In this case, the first and second analog pixel signals output in operation S101 and operation S103 may correspond to the green pixels or the white pixels.

Figure 5:
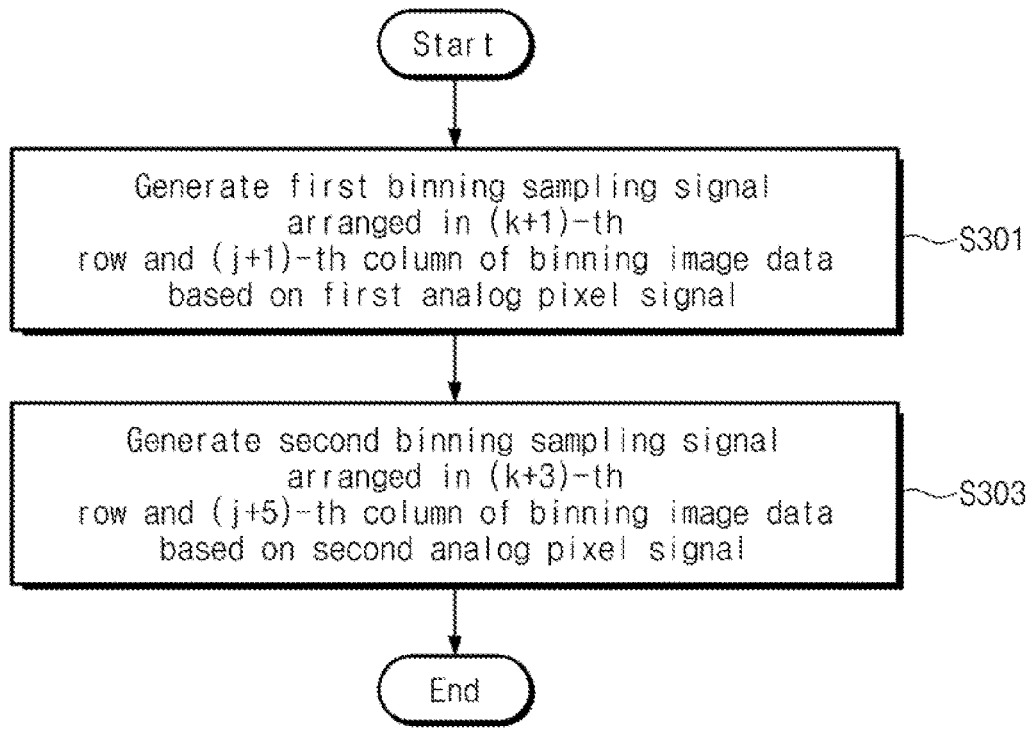
FIG. 5 is a flowchart illustrating an example of outputting binning image data corresponding to an operation S200 shown in FIG. 1.

FIG. 5 is a flowchart illustrating an example of outputting binning image data corresponding to an operation S200 shown in FIG. 1.

Referring to FIGS. 4 and 5, in outputting of binning image data, a first binning sampling signal is generated based on the first analog pixel signal (S301), and a second binning sampling signal is generated based on the second analog pixel signal (S303).

According to an embodiment, the first binning sampling signal may be disposed at a (k+1)-th row and a (j+1)-th column of the binning image data described with reference to FIGS. 1 and 2. The second binning sampling signal may be disposed at the (k+3)-th row and (j+5)-th column of the binning image data. In this case, the first and second binning sampling signals may respectively correspond to the first and second analog pixel signals, and may be counting result values obtained by performing the CDS operation and the counting operation on the first and second analog pixel signals.

Figure 6:
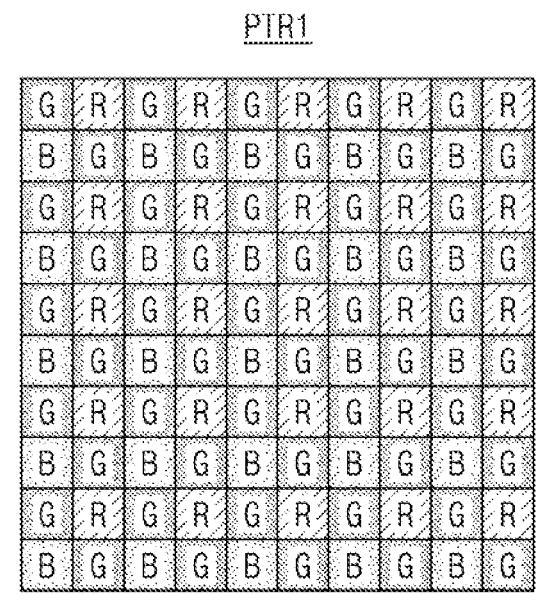

FIG. 6 is a diagram for describing a first pattern in which pixels included in a pixel array of FIG. 2 are arranged, according to an embodiment.

Referring to FIG. 6, pixels may be arranged in a first pattern PTR1. The pixels may include green pixels "G", red pixels "R", and blue pixels "B". A first row may include the green pixel "G" and the red pixel "R" that are alternately and repeatedly disposed, and a second row may include the blue pixel "B" and the green pixel "G" that are alternately and repeatedly disposed. Further, the first and second rows may be disposed repeatedly in a column direction. That is, the pixels may be arranged in the RGB Bayer pattern. Examples of the method of binning an image sensor according to an embodiment when the pixels are arranged in the RGB Bayer pattern will be described in detail with reference to FIGS. 9, 10A, 10B, 10C, and 10D.

Figure 7:
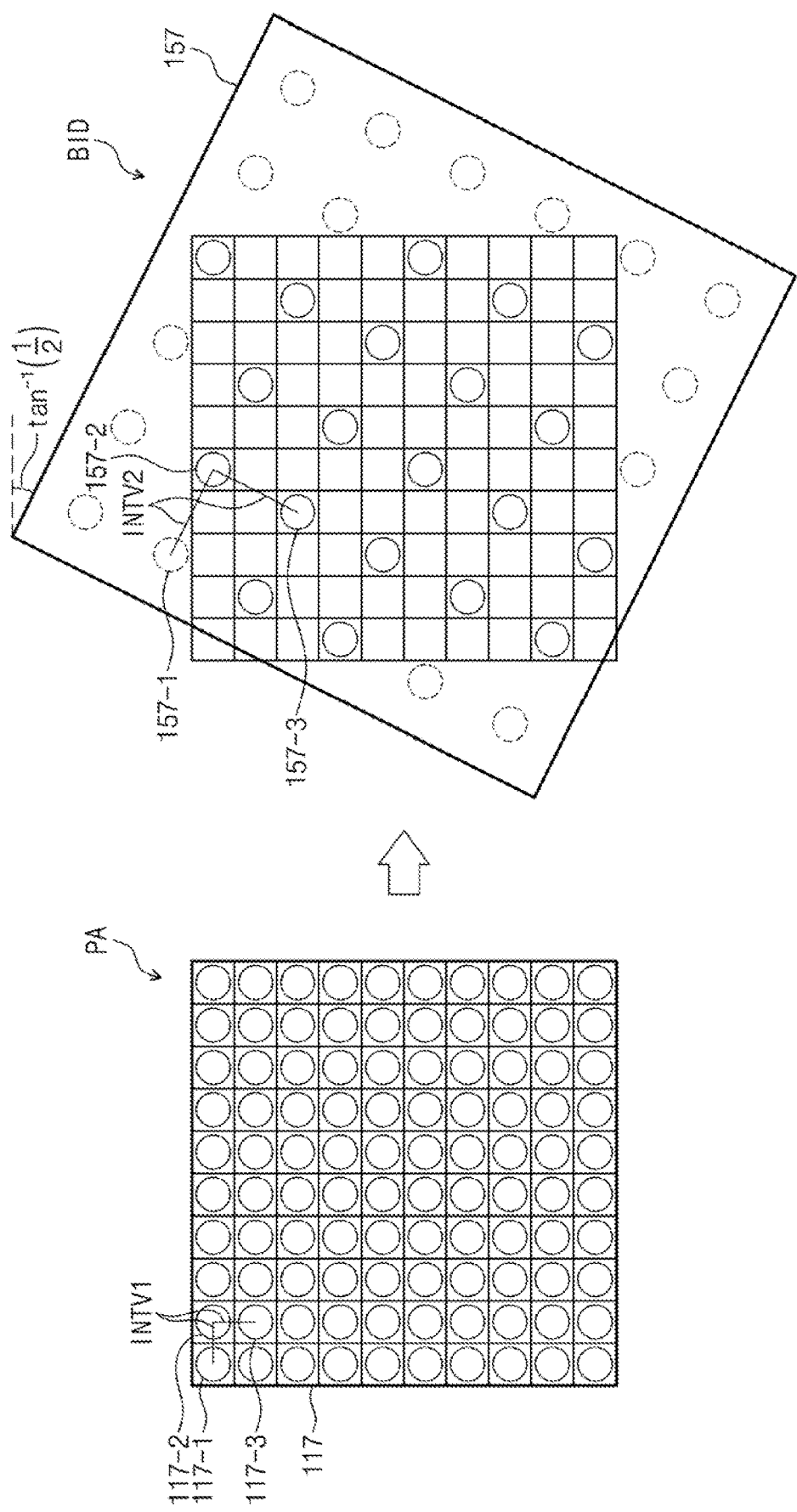
FIG. 7 is a diagram for describing a pattern in which pixels included in a pixel array of FIG. 2 are arranged and a pattern in which binning sampling signals of FIG. 1 are arranged, according to an embodiment.

FIG. 7 is a diagram for describing a pattern in which pixels included in a pixel array of FIG. 2 are arranged, and a pattern in which binning sampling signals of FIG. 1 are arranged, according to an embodiment.

Referring to FIG. 7, a pixel array PA may include pixels, and binning image data BID may include binning sampling signals. The pixels and the binning sampling signals are marked by a circle in the pixel array PA and the binning image data BID. A dotted circle in the binning image data BID is provided only for convenience of description.

According to an embodiment, the pixels may have a first matrix shape 117, and may be arranged repeatedly in the row and column directions at a first interval INTV1. For example, pixels 117-1 and 117-2 may be arranged in the row direction so as to be spaced from each other by the first interval INTV1, and pixels 117-2 and 117-3 may be arranged in the column direction so as to be spaced from each other by the first interval INTV1.

According to an embodiment, the binning sampling signals may have a second matrix shape 157, and may be arranged repeatedly at a second interval INTV2 different from the first interval INTV1 (or so as to be spaced from each other by the second interval INTV2). For example, the second interval INTV2 may be correspond to $5^{(1/2)}$ times the first interval INTV1.

According to an embodiment, the second matrix shape 157 may correspond to a shape that is obtained by rotating the first matrix shape 117 clockwise by $\tan^{-1}(1/2)$. For example, the pixels in the pixel array PA may be arranged repeatedly based on a first direction extending from the pixel 117-1 to the pixel 117-2, and a second direction perpendicular to the first direction and extending from the pixel 117-2 to the pixel 117-3. The binning sampling signals may be arranged repeatedly based on a third direction extending from a binning sampling signal 157-1 to a binning sampling signal 157-2, and a fourth direction perpendicular to the third direction and extending from the binning sampling signal 157-2 to a binning sampling signal 157-3. The third direction may be a direction in which the first direction is rotated clockwise by $\tan^{-1}(1/2)$, and the fourth direction may be a direction in which the second direction is rotated clockwise by $\tan^{-1}(1/2)$.

According to an embodiment, the binning sampling signals may have the same RGB Bayer pattern as the pixels except that the binning sampling signals are different in shape and interval from the pixels.

Figure 8:
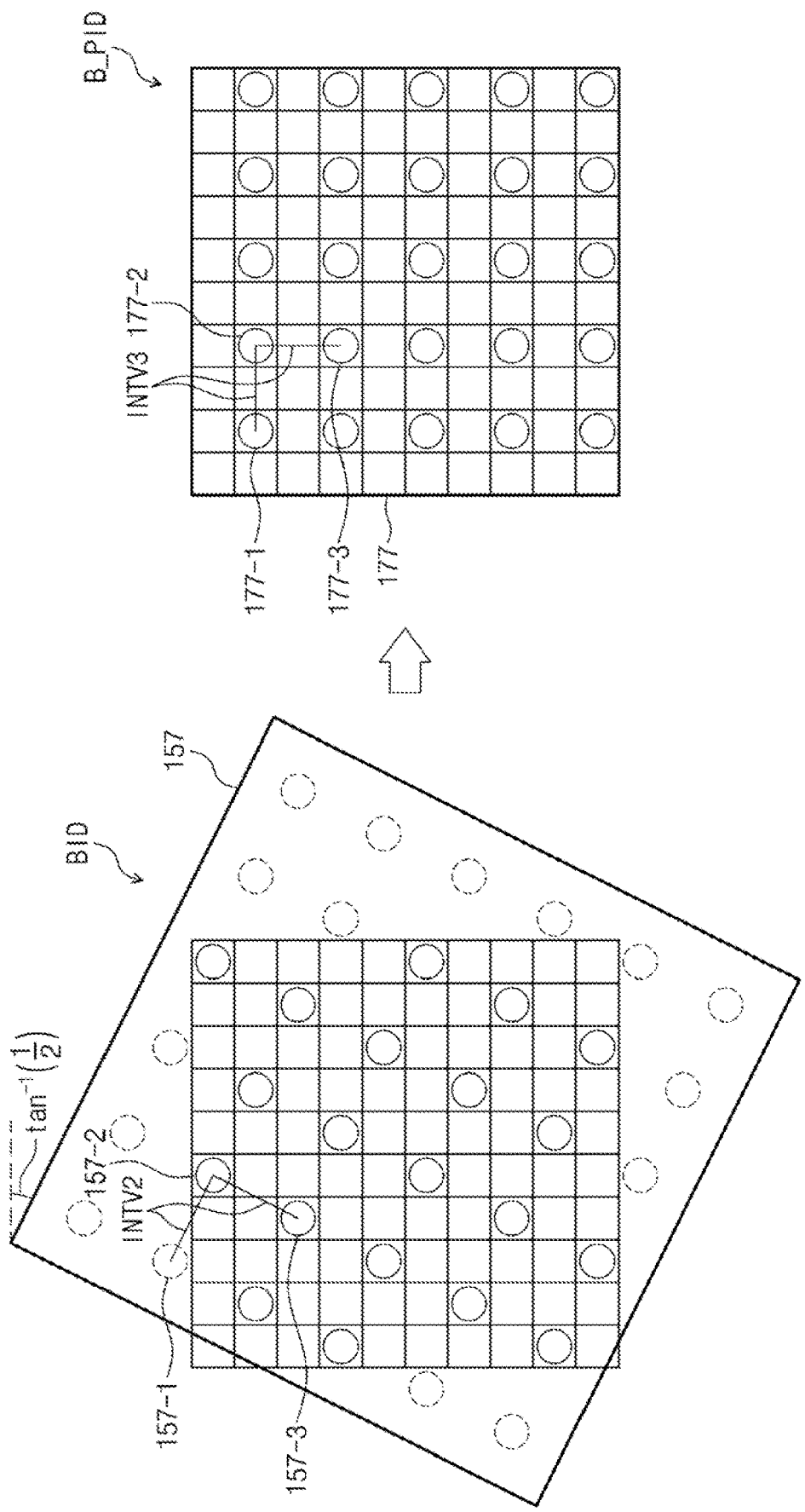
FIG. 8 is a diagram for describing a pattern in which values included in binning sampling signals and Bayer pattern image data of FIG. 1 are arranged, according to an embodiment.

FIG. 8 is a diagram for describing a pattern in which values included in binning sampling signals and Bayer pattern image data of FIG. 1 are arranged, according to an embodiment.

Referring to FIGS. 7 and 8, the binning image data BID may include binning sampling signals, and Bayer pattern image data B_PID may include digital values. The binning sampling signals and the digital values are marked by a circle in the binning image data BID and the Bayer pattern image data B_PID. The binning image data BID are identical to the binning image data illustrated in FIG. 7, and thus, additional description will be omitted to avoid redundancy.

According to an embodiment, the digital values may have the first matrix shape 177, and may be arranged repeatedly in the row and column directions at a third interval INTV3. For example, digital values 177-1 and 177-2 may be arranged in the row direction so as to be spaced from each other by the third interval INTV3, and digital values 177-2 and 177-3 may be arranged in the column direction so as to be spaced from each other by the third interval INTV3. For example, the third interval INTV3 may correspond to two times the first interval INTV1.

According to an embodiment, the digital values may have the same RGB Bayer pattern and shape as the pixels except that the digital values are different from the pixels in the pixel array PA shown in FIG. 8 by their respective intervals.

Figure 9:
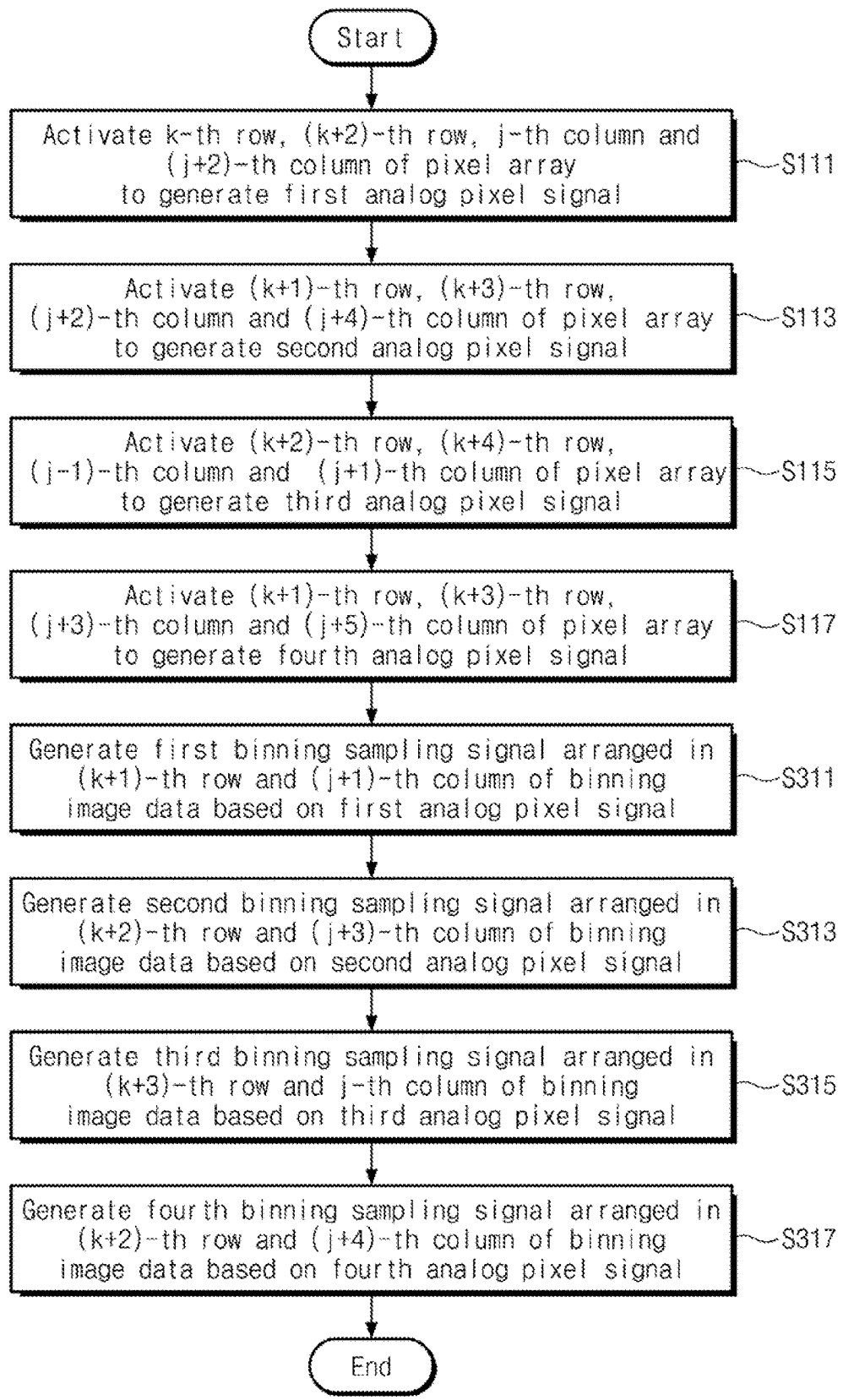
FIG. 9 is a flowchart illustrating an example of outputting analog image data and outputting binning image data corresponding to operations shown in FIG. 1.

FIG. 9 is a flowchart illustrating an example of outputting analog image data and outputting binning image data corresponding to operations shown in FIG. 1.

Referring to FIG. 9, in outputting analog image data, a first analog pixel signal is generated (S111), a second analog pixel signal is generated (S113), a third analog pixel signal is generated (S115), and a fourth analog pixel signal is generated (S117).

According to an embodiment, the first analog pixel signal may be generated by simultaneously activating a k-th row, a (k+2)-th row, a j-th column, and a (j+2)-th column of the pixel array described with reference to FIGS. 1 and 2. In this case, an analog signal corresponding to all photo charges integrated by photodiodes of pixels disposed at (k, j), ((k+2), j), (k, (j+2)), and ((k+2), (j+2)) of the pixel array may be output as the first analog pixel signal.

According to an embodiment, the second analog pixel signal may be generated by simultaneously activating a (k+1)-th row, a (k+3)-th row, the (j+2)-th column, and a (j+4)-th column of the pixel array. The third analog pixel signal may be generated by simultaneously activating the (k+2)-th row, a (k+4)-th row, a (j−1)-th column, and a (j+1)-th column of the pixel array. The fourth analog pixel signal may be generated by simultaneously activating the (k+1)-th row, the (k+3)-th row, a (j+3)-th column, and a (j+5)-th column of the pixel array. In this case, as in the first analog pixel signal, the second to fourth analog pixel signals may be output from pixels arranged at corresponding rows and columns of the pixel array.

According to an embodiment, when pixels included in the pixel array are arranged in the RGB Bayer pattern, the first analog pixel signal and the fourth analog pixel signal may correspond to green pixels, the second analog pixel signal may correspond to blue signals, and the third analog pixel signal may correspond to red pixels.

In outputting of binning image data, a first binning sampling signal is generated based on the first analog pixel signal (S311), a second binning sampling signal is generated based on the second analog pixel signal (S313), a third binning sampling signal is generated based on the third analog pixel signal (S315), and a fourth binning sampling signal is generated based on the fourth analog pixel signal (S317).

According to an embodiment, the first binning sampling signal may be disposed at the (k+1)-th row and (j+1)-th column of the binning image data. The second binning sampling signal may be disposed at the (k+2)-th row and (j+3)-th column of the binning image data. The third binning sampling signal may be disposed at the (k+3)-th row and j-th column of the binning image data. The fourth binning sampling signal may be disposed at the (k+2)-th row and (j+4)-th column of the binning image data. In this case, the first to fourth binning sampling signals may respectively correspond to the first to fourth analog pixel signals, and may be counting result values obtained by performing the CDS operation and the counting operation on the first to fourth analog pixel signals.

According to an embodiment, when pixels included in the pixel array are arranged in the RGB Bayer pattern, the first binning sampling signal and the fourth binning sampling signal may correspond to green pixels, the second binning sampling signal may correspond to blue pixels, and the third binning sampling signal may correspond to red pixels.

FIGS. 10A, 10B, 10C, and 10D are diagrams for describing a method of generating binning image data from pixels arranged in a first pattern of FIG. 6, according to an embodiment.

Figure 10A:
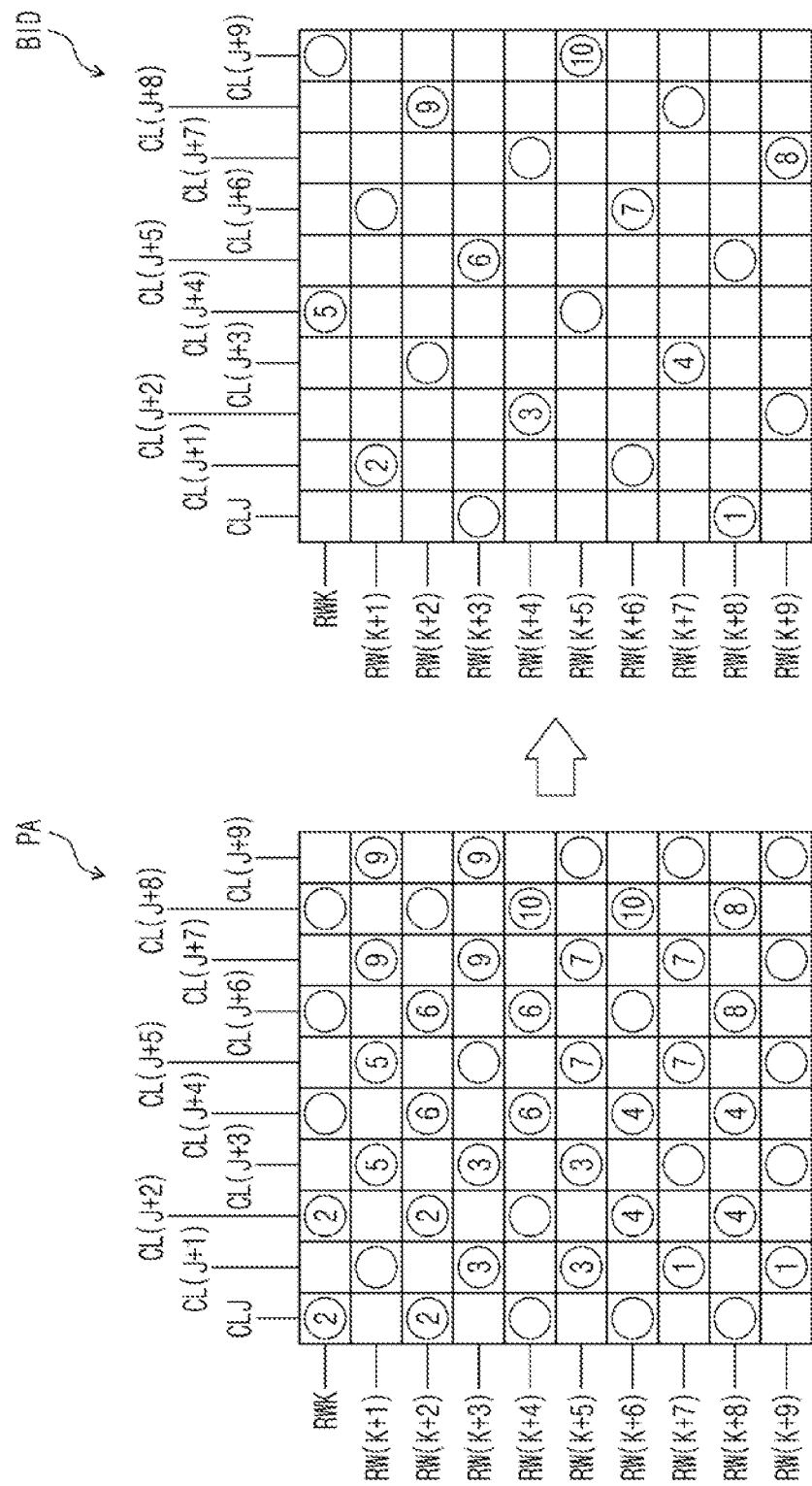
FIGS. 10A, 10B, 10C, and 10D are diagrams for describing a method of generating binning image data from pixels arranged in a first pattern shown in FIG. 6, according to an embodiment.
Figure 10B:
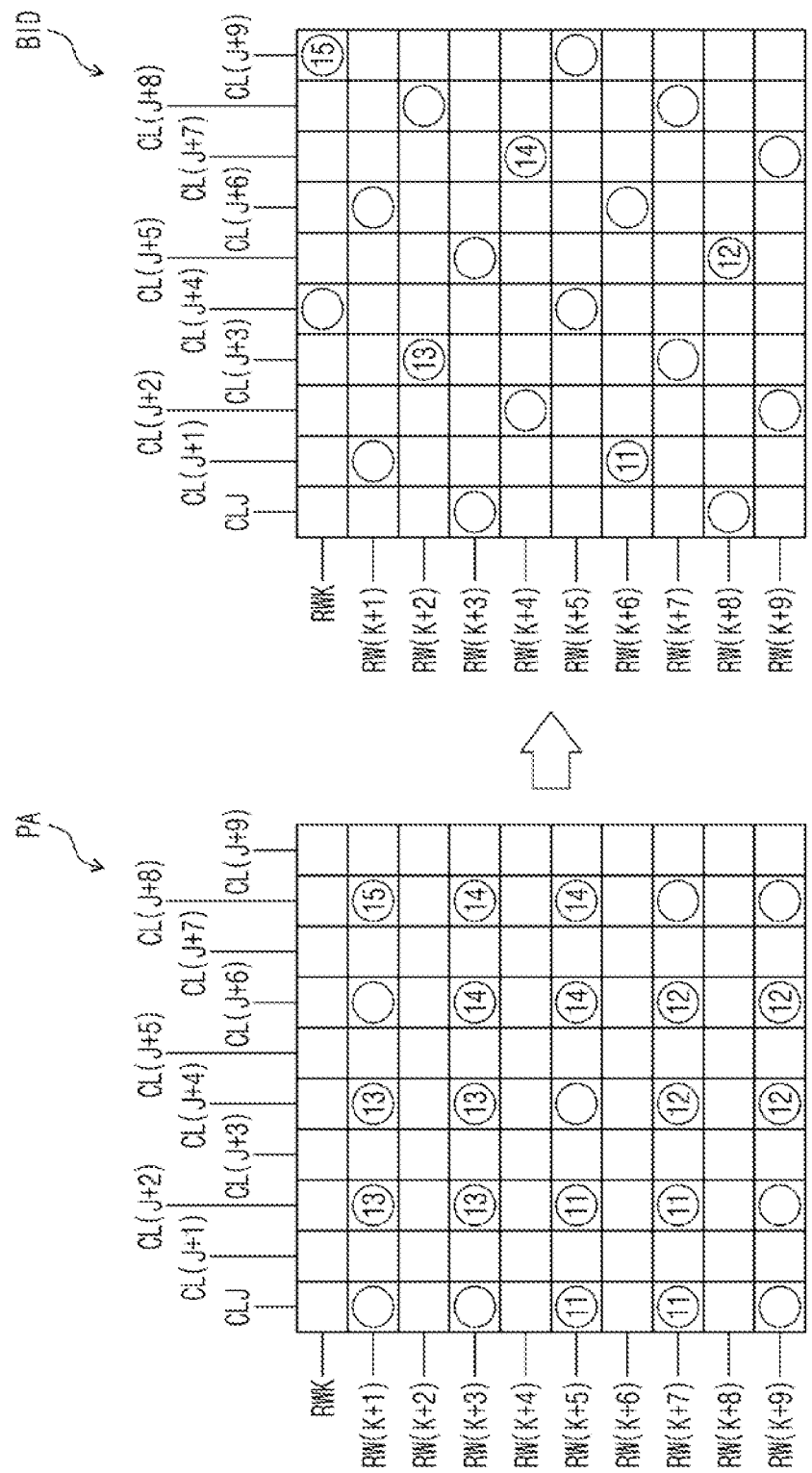
Figure 10C:
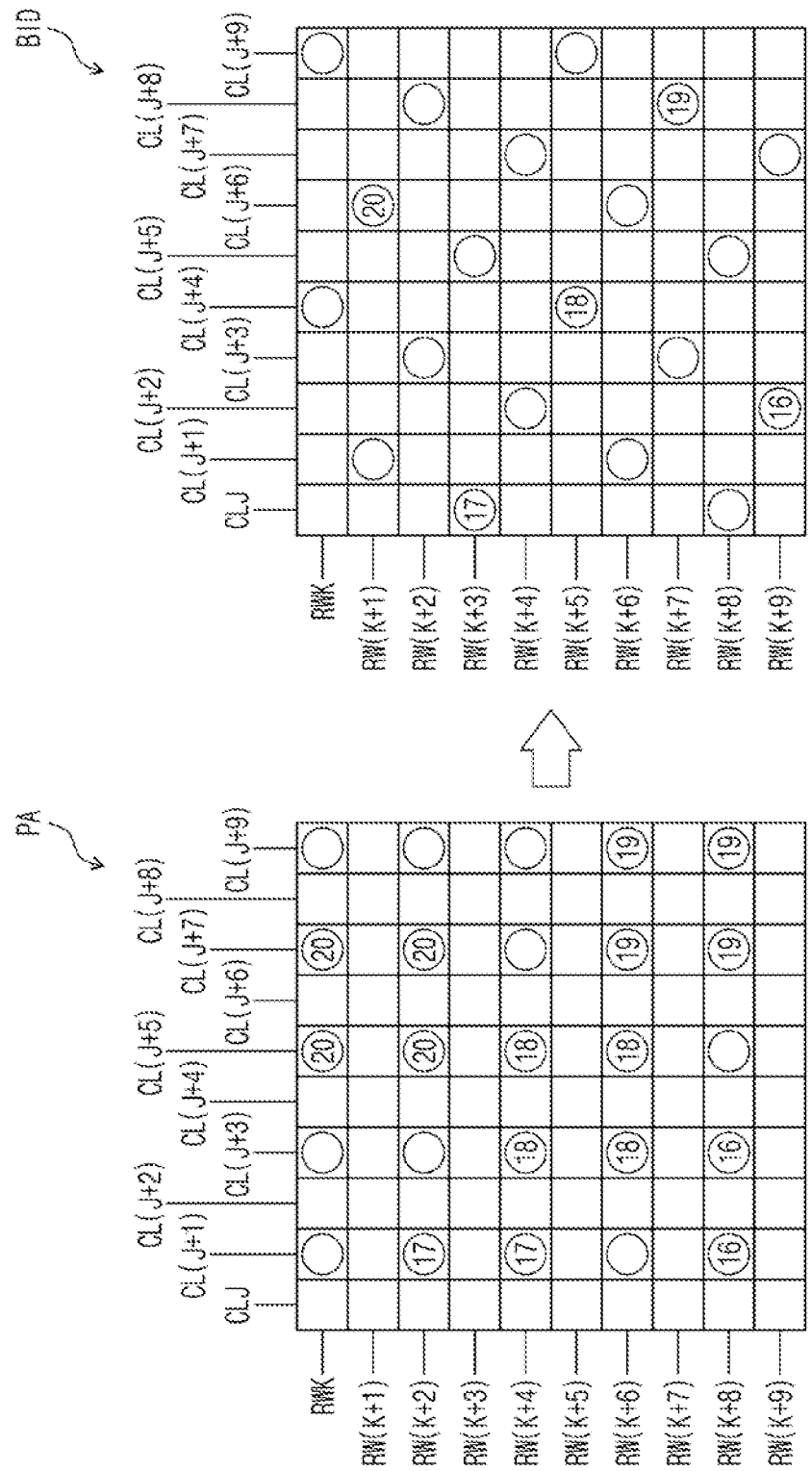

In FIGS. 10A, 10B, and 10C, for convenience of description, only pixels included in a unit pixel group corresponding to the unit pixel group described with reference to FIG. 1 are illustrated in a pixel array PA. In FIGS. 10A, 10B, 10C, and 10D, only binning sampling signals generated from the unit pixel group are illustrated in a binning image data BID. When the pixels are arranged in the RGB Bayer pattern, only green pixels are marked by a circle in FIG. 10A, only blue pixels are marked by a circle in FIG. 10B, and only red pixels are marked by a circle in FIG. 10C.

Referring to FIG. 10A, a binning sampling signal marked by number "1" may be generated based on green pixels marked by number "1". Similarly, binning sampling signals marked by numbers "2", "3", "4", "5", "6", "7", "8", "9", and "10" may be generated.

Referring to FIG. 10B, a binning sampling signal marked by number "11" may be generated based on blue pixels marked by number "11". Similarly, binning sampling signals marked by numbers "12", "13", "14", and "15" may be generated.

Referring to FIG. 10C, a binning sampling signal marked by number "16" may be generated based on red pixels marked by number "16". Similarly, binning sampling signals marked by numbers "17", "18", "19", and "20" may be generated.

Figure 10D:
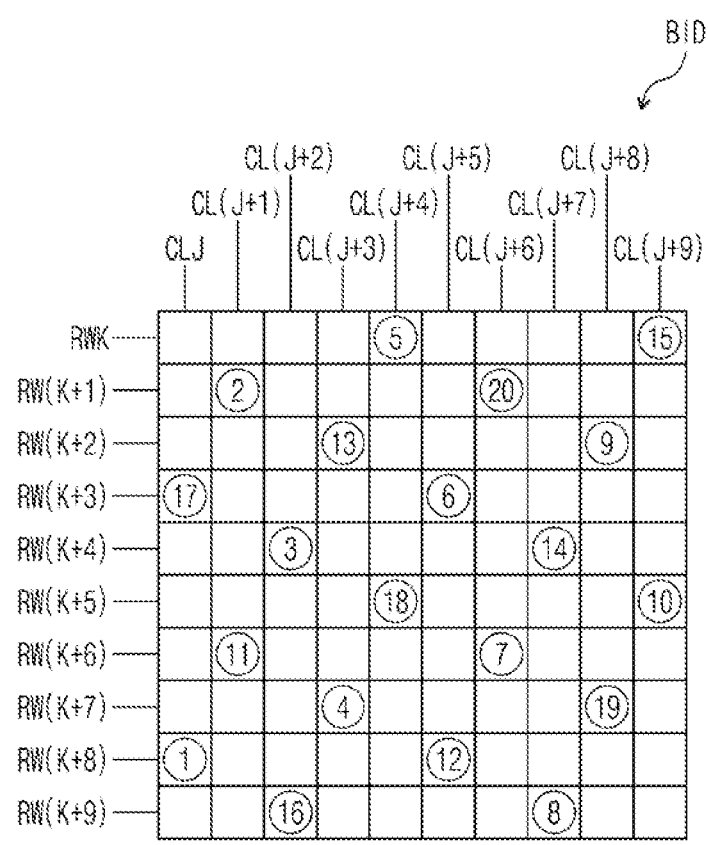

All the binning sampling signals included in the binning image data BID illustrated in FIGS. 10A, 10B, and 10C are illustrated in FIG. 10D. When the pixels included in the pixel array PA are arranged in the RGB Bayer pattern, the binning image data BID may be generated from the pixels included in the unit pixel group as illustrated in FIG. 10D.

Figure 11:
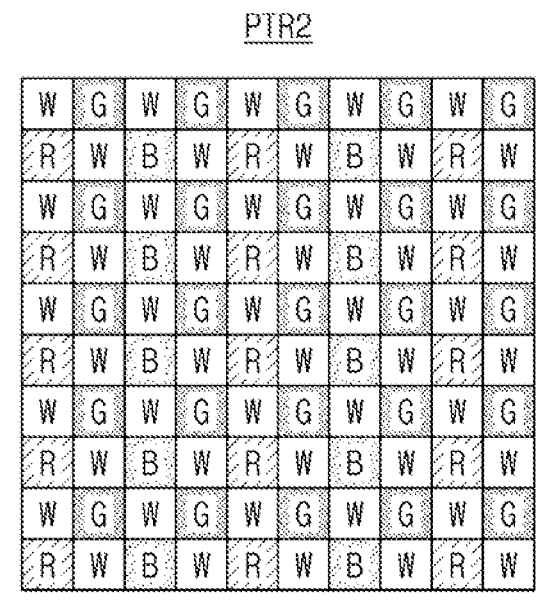

FIG. 11 is a diagram for describing a second pattern in which pixels included in a pixel array of FIG. 2 are arranged, according to an embodiment.

Referring to FIG. 11, pixels may be arranged in a second pattern PTR2. The pixels may include white pixels "W", green pixels "G", red pixels "R", and blue pixels "B. As illustrated in FIG. 11, a first row may include the white pixel "W" and the green pixel "G" that are alternately and repeatedly arranged, a second row may include the red pixel "R", the white pixel "W", the blue pixel "B" and the white pixel "W" that are alternately and repeatedly arranged, a third row may include the white pixel "W" and the green pixel "G" that are alternately and repeatedly arranged, and a fourth row may include the blue pixel "B", the white pixel "W", the red pixel "R" and the white pixel "W" are alternately and repeatedly arranged. Further, the first to fourth rows may be disposed repeatedly in a column direction. That is, the pixels may be arranged in the RGBW non-Bayer pattern. Examples of a method of binning an image sensor according to an embodiment when pixels are arranged in the RGBW non-Bayer pattern will be described in detail with reference to FIGS. 12, 13, 14A, 14B, 14C, 14D, 15, 16A, and 16B.

Figure 12:
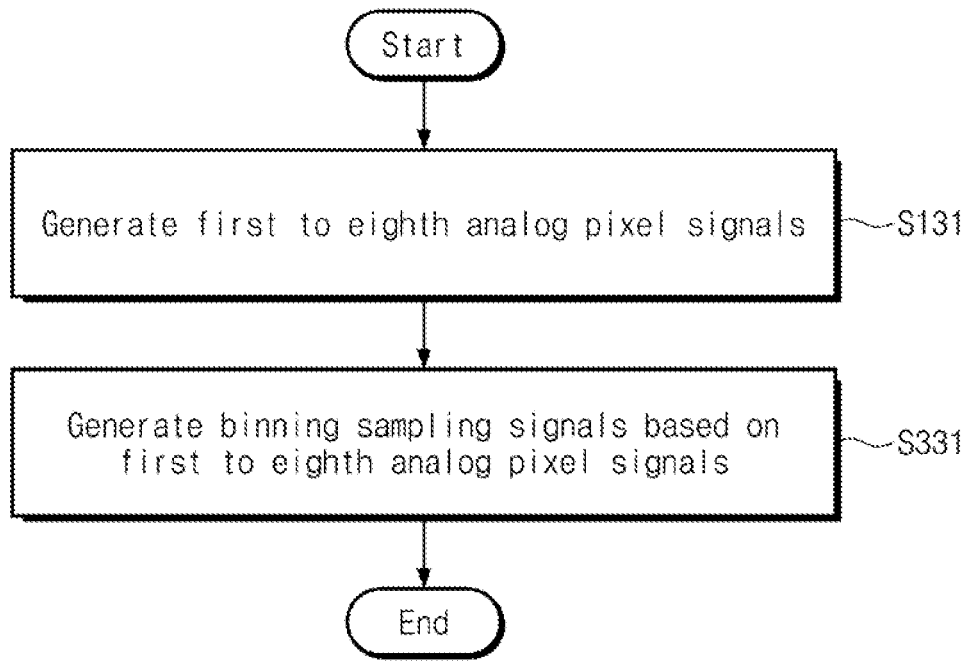
FIG. 12 is a flowchart illustrating an example of outputting analog image data and outputting binning image data corresponding to operations shown in FIG. 1.

FIG. 12 is a flowchart illustrating an example of outputting analog image data and outputting binning image data corresponding to operations shown in FIG. 1.

Referring to FIG. 12, in outputting analog image data, first to eighth analog pixel signals are generated (S131), and first to eighth binning sampling signals are generated based on the first to eighth analog pixel signals (S331).

According to an embodiment, the first analog pixel signal may be generated by simultaneously activating a k-th row, a (k+2)-th row, a j-th column and the (j+2)-th column of the pixel array 110 described with reference to FIGS. 1 and 2. In this case, an analog signal corresponding to all photo charges integrated by photodiodes of pixels disposed at (k, j), ((k+2), j), (k, (j+2)), and ((k+2), (j+2)) of the pixel array 110 may be output as the first analog pixel signal.

According to an embodiment, the second analog pixel signal may be generated by simultaneously activating the (k+2)-th row, a (k+4)-th row, a (j+4)-th column, and a (j+6)-th column of the pixel array 110. The third analog pixel signal may be generated by simultaneously activating a (k+3)-th row, a (k+5)-th row, a (j+1)-th column, and a (j+3)-th column of the pixel array 110. The fourth analog pixel signal may be generated by simultaneously activating a (k+5)-th row, a (k+7)-th row, a (j+5)-th column, and a (j+7)-th column of the pixel array 110. The fifth analog pixel signal may be generated by simultaneously activating the (k+2)-th row, the (k+4)-th row, a (j−1)-th column, and the (j+1)-th column of the pixel array 110. The sixth analog pixel signal may be generated by simultaneously activating the (k+4)-th row, a (k+6)-th row, the (j+5)-th column, and a (j+7)-th column of the pixel array 110. In this case, as in the first analog pixel signal, the second to sixth analog pixel signals may be output from pixels arranged at corresponding rows and columns of the pixel array 110.

According to an embodiment, when the pixels included in the pixel array 110 are arranged in the RGBW non-Bayer pattern, the first to fourth analog pixel signals may correspond to white pixels, and the fifth and sixth analog pixel signals may correspond to green pixels.

The seventh and eight analog pixel signals may be generated in a manner to be described with reference to FIGS. 13, 14C, and 14D, or in a manner to be described with reference to FIGS. 15, 16A, and 16B.

Figure 13:
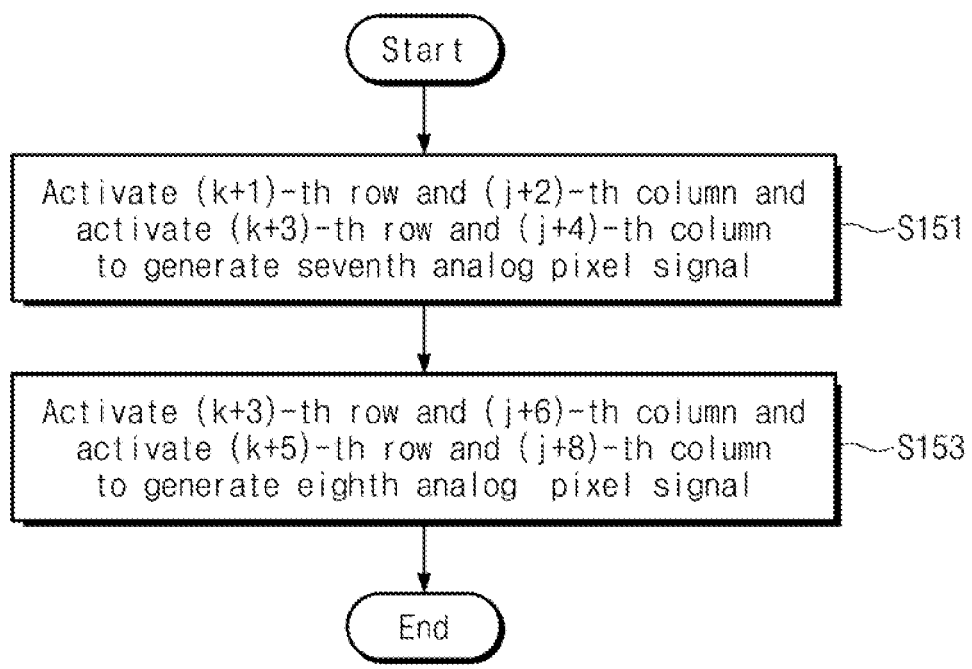
FIG. 13 is a flowchart illustrating an example of outputting analog image data corresponding to an operation shown in FIG. 12.

FIG. 13 is a flowchart illustrating an example of outputting analog image data corresponding to an operation shown in FIG. 12.

Referring to FIGS. 12, and 13, in outputting analog image data, the seventh analog pixel signal is generated (S151), and the eighth analog pixel signal is generated (S153).

According to an embodiment, the seventh analog pixel signal may be generated by activating the (k+1)-th row and the (j+2)-th column and the (k+3)-th row and the (j+4)-th column of the pixel array 110 described with reference to FIGS. 1 and 2. In this case, an analog signal corresponding to all photo charges integrated by photodiodes of pixels disposed at ((k+1), (j+2)) and ((k+3), (j+4)) of the pixel array 110 may be output as the seventh analog pixel signal.

According to an embodiment, the eighth analog pixel signal may be generated by activating the (k+3)-th row and the (j+6)-th column of the pixel array 110 and activating the (k+5)-th row and a (j+8)-th column of the pixel array 110. In this case, an analog signal corresponding to all photo charges integrated by photodiodes of pixels disposed at ((k+3), (j+6)) and ((k+5), (j+8)) of the pixel array 110 may be output as the eighth analog pixel signal.

According to an embodiment, when the pixels included in the pixel array 110 are arranged in the RGBW non-Bayer pattern, the seventh analog pixel signal may correspond to a red pixel based on the red pixels at ((k+1), (j+2) and (k+3), (j+2)), and the eighth analog pixel signal may correspond to a blue pixel based on the blue pixels at ((k+3), (j+8) and (k+5), (j+8)).

FIGS. 14A, 14B, 14C, 14D, and 14E are diagrams for describing a method of generating binning image data from pixels arranged in the second pattern, according to an embodiment.

In FIGS. 14A, 14B, 14C, and 14D, for convenience of description, only pixels included in the unit pixel group described with reference to FIG. 1 are illustrated in the pixel array PA. In FIGS. 14A, 14B, 14C, 14D, and 14E, only binning sampling signals generated from the unit pixel group are illustrated in a binning image data BID. When the pixels are arranged in the RGBW non-Bayer pattern, only white pixels are marked by a circle in FIG. 14A, only green pixels are marked by a circle in FIG. 14B, only red pixels are marked by a circle in FIG. 14C, and only blue pixels are marked by a circle in FIG. 14D.

Figure 14A:
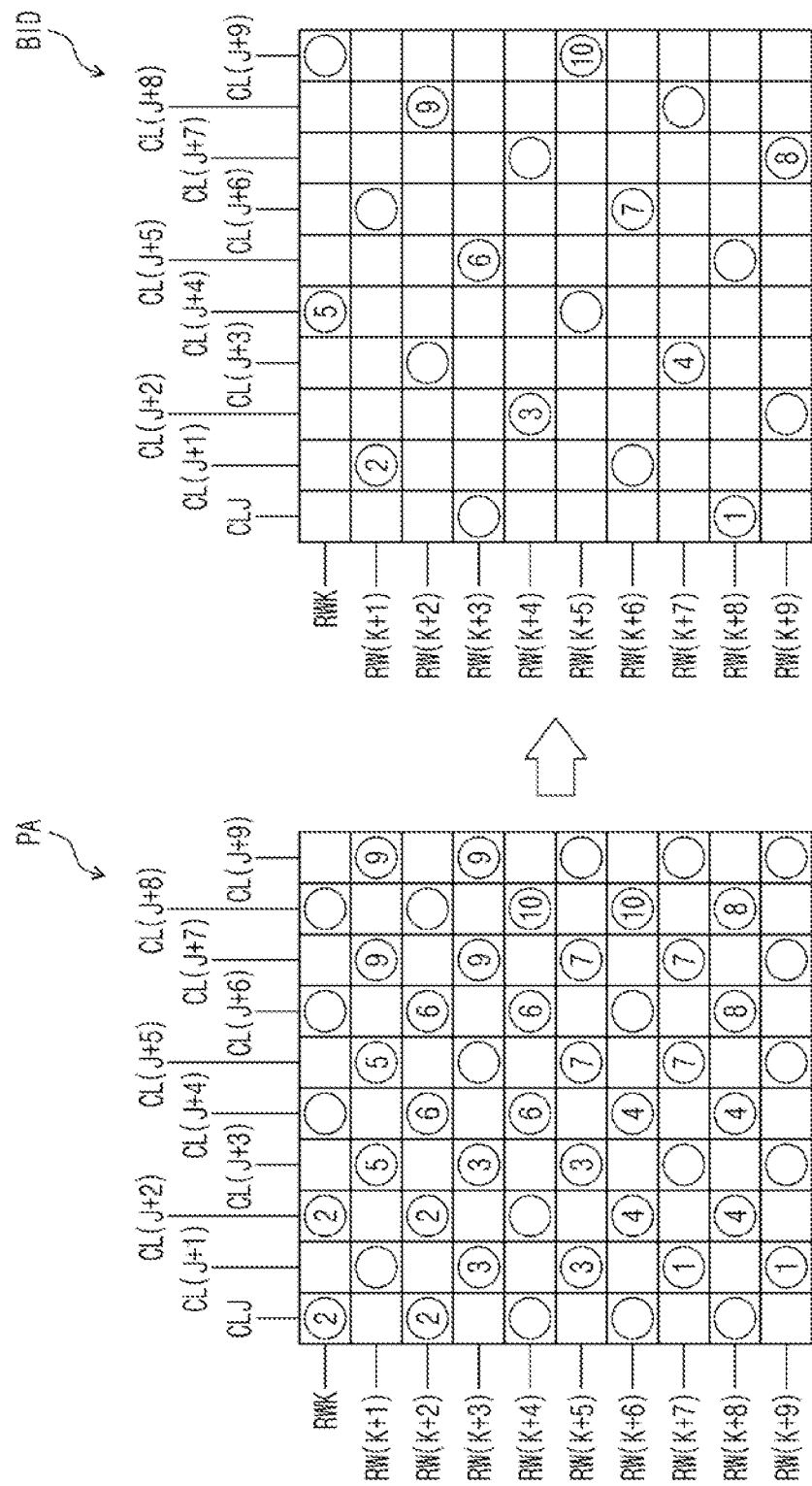
FIGS. 14A, 14B, 14C, 14D, and 14E are diagrams for describing a method of generating binning image data from pixels arranged in the second pattern, according to an embodiment.

Referring to FIG. 14A, a binning sampling signal marked by number "1" may be generated based on white pixels marked by number "1". Similarly, binning sampling signals marked by numbers "2", "3", "4", "5", "6", "7", "8", "9", and "10" may be generated.

Figure 14B:
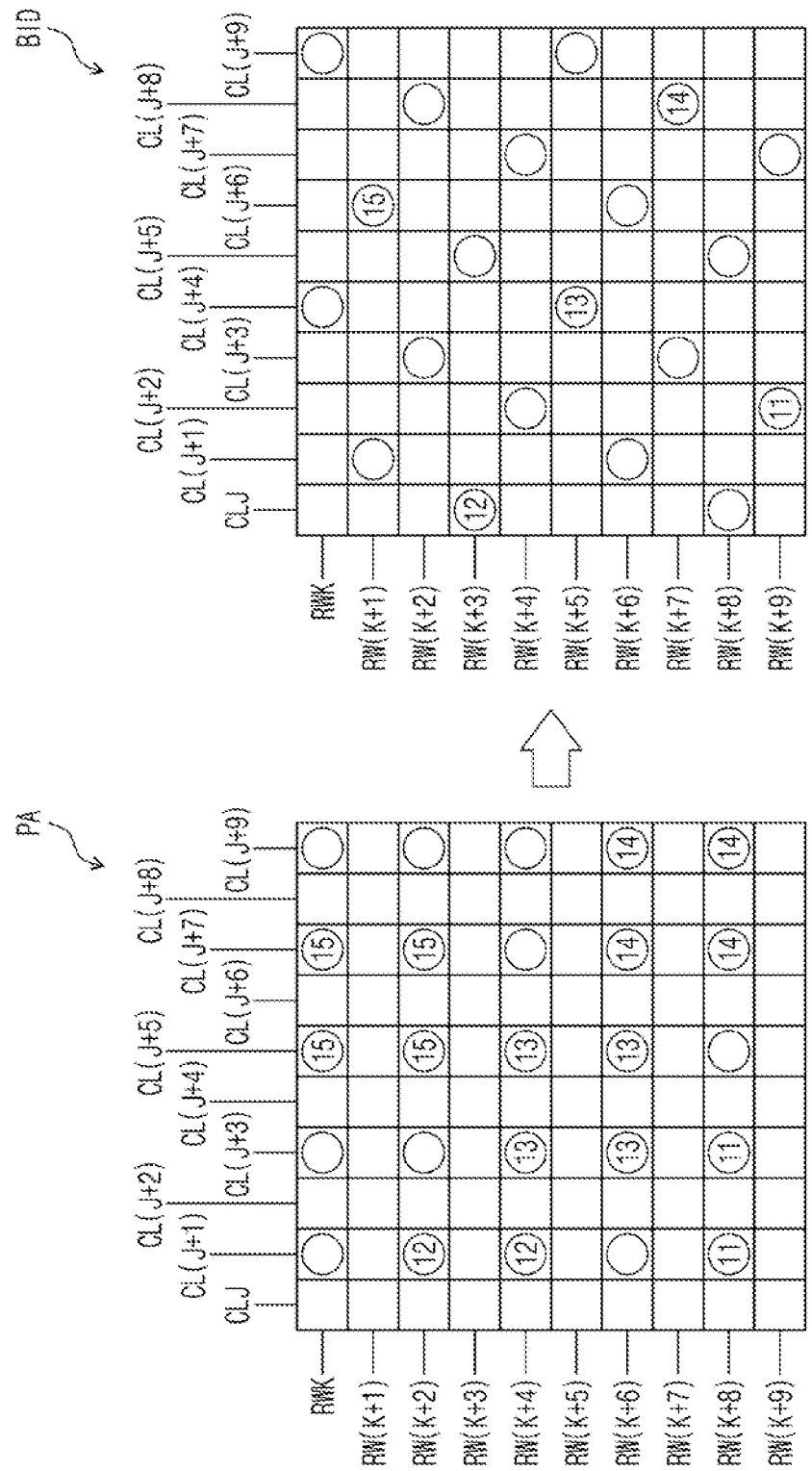

Referring to FIG. 14B, a binning sampling signal marked by number "11" may be generated based on green pixels marked by number "11". Similarly, binning sampling signals marked by numbers "12", "13", "14", and "15" may be generated.

Figure 14C:
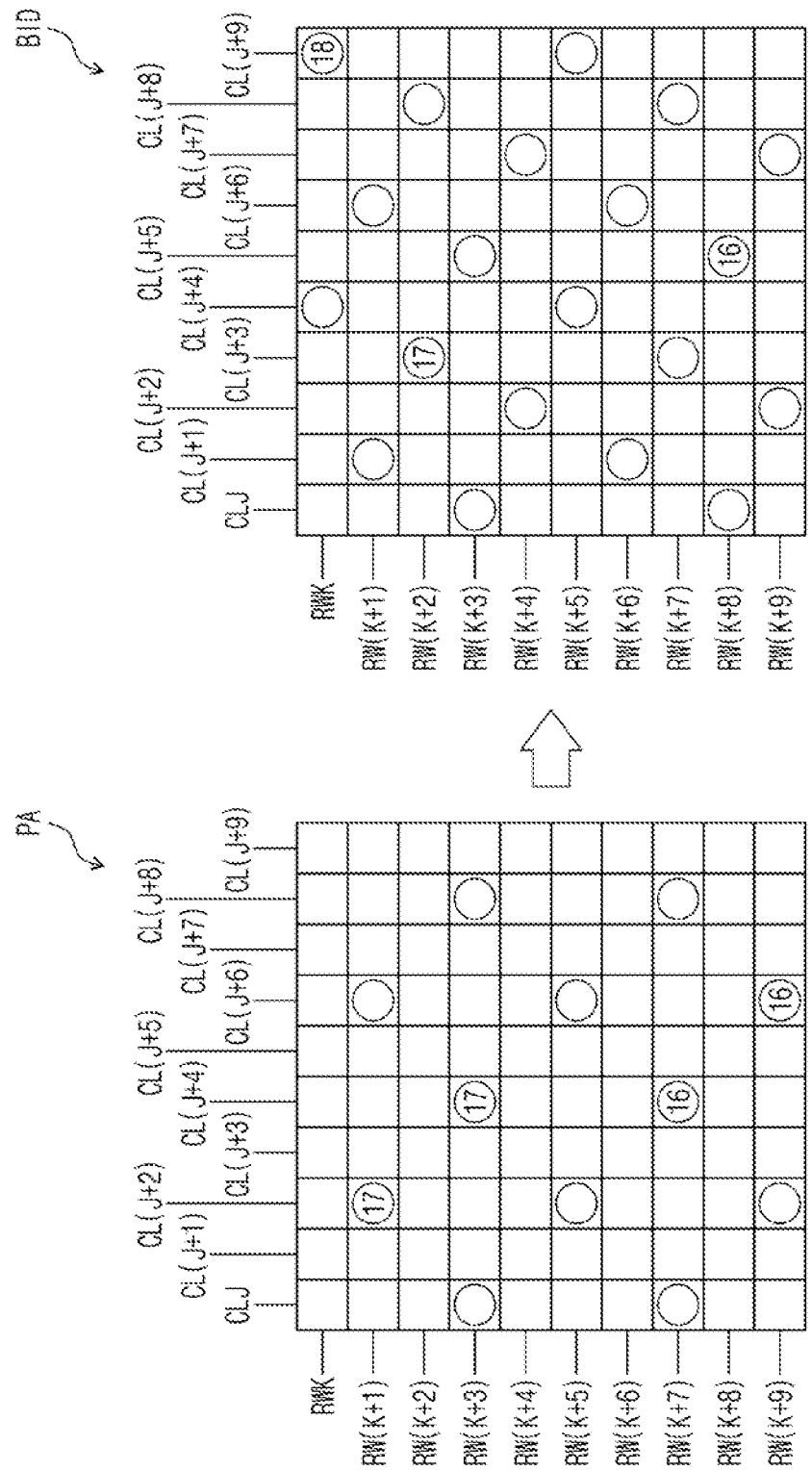

Referring to FIG. 14C, a binning sampling signal marked by number "16" may be generated based on blue pixels marked by number "16". Similarly, binning sampling signals marked by numbers "17" and "18" may be generated.

Figure 14D:
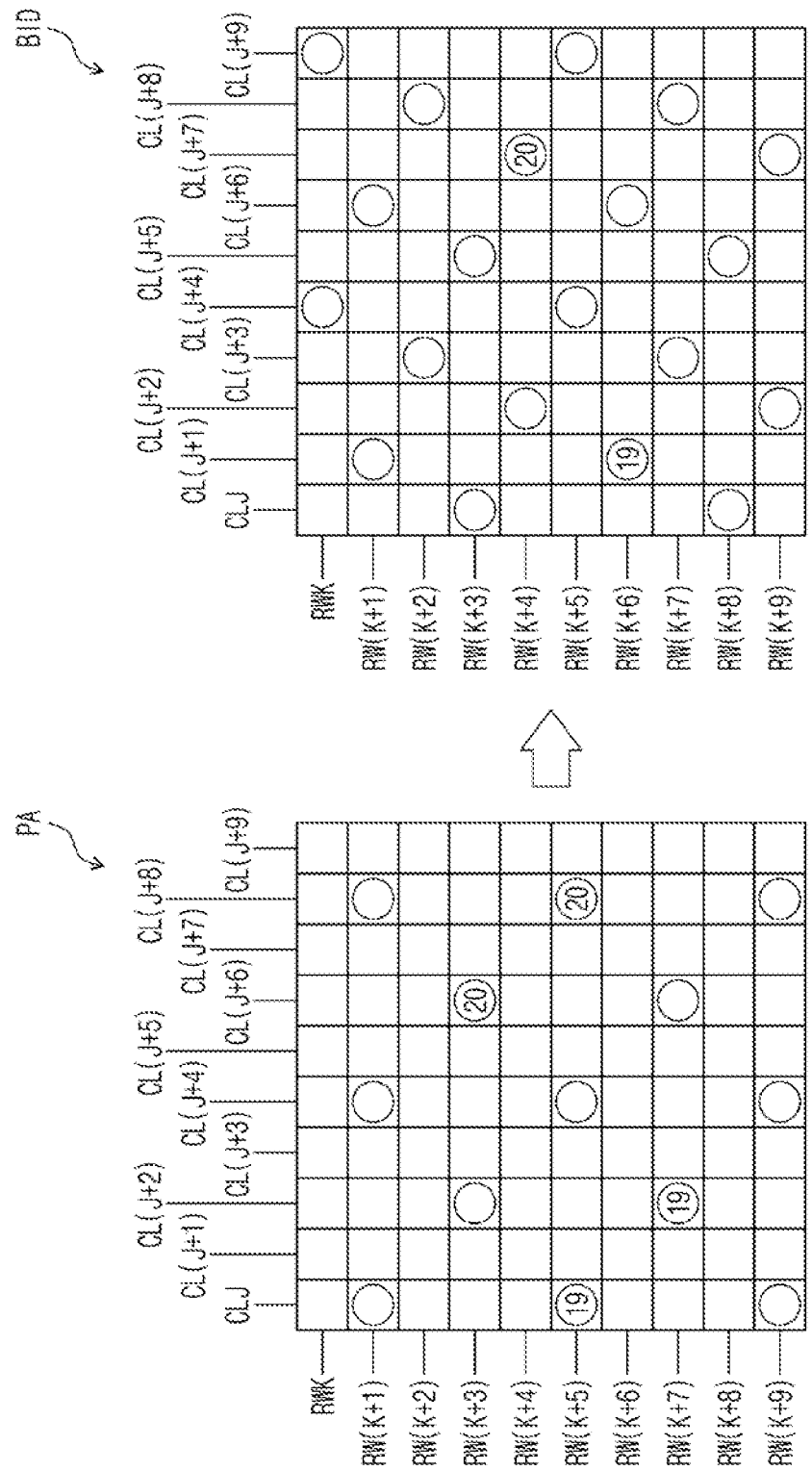

Referring to FIG. 14D, a binning sampling signal marked by number "19" may be generated based on red pixels marked by number "19". Similarly, a binning sampling signal marked by number "20" may be generated.

Figure 14E:
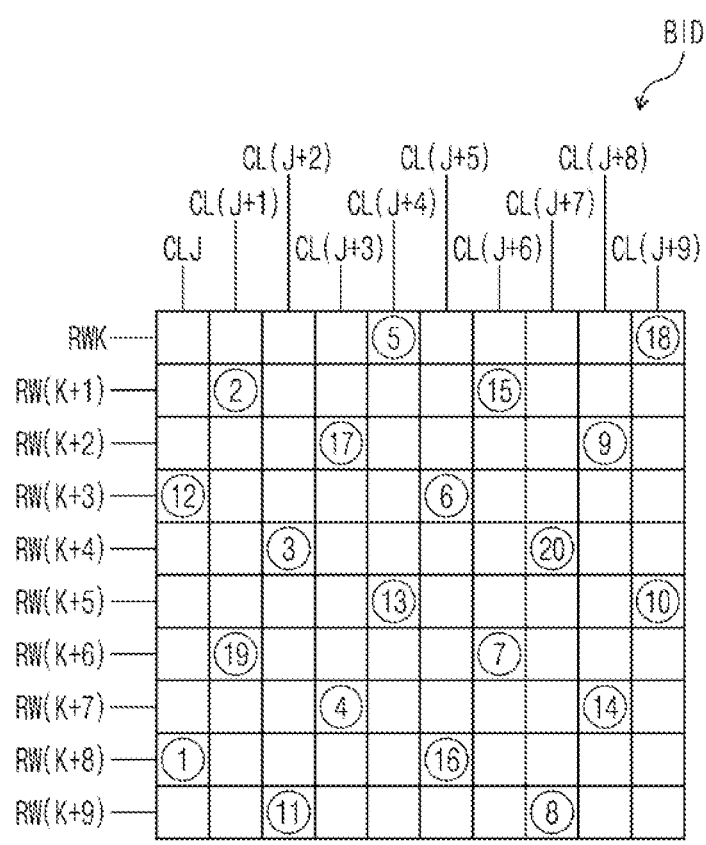

All the binning sampling signals included in the binning image data BID illustrated in FIGS. 14A, 14B, 14C, and 14D are illustrated in FIG. 14E. When the pixels included in the pixel array PA are arranged in the RGBW non-Bayer pattern, the binning image data BID may be generated from the pixels included in the unit pixel group as illustrated in FIG. 14E.

Figure 15:
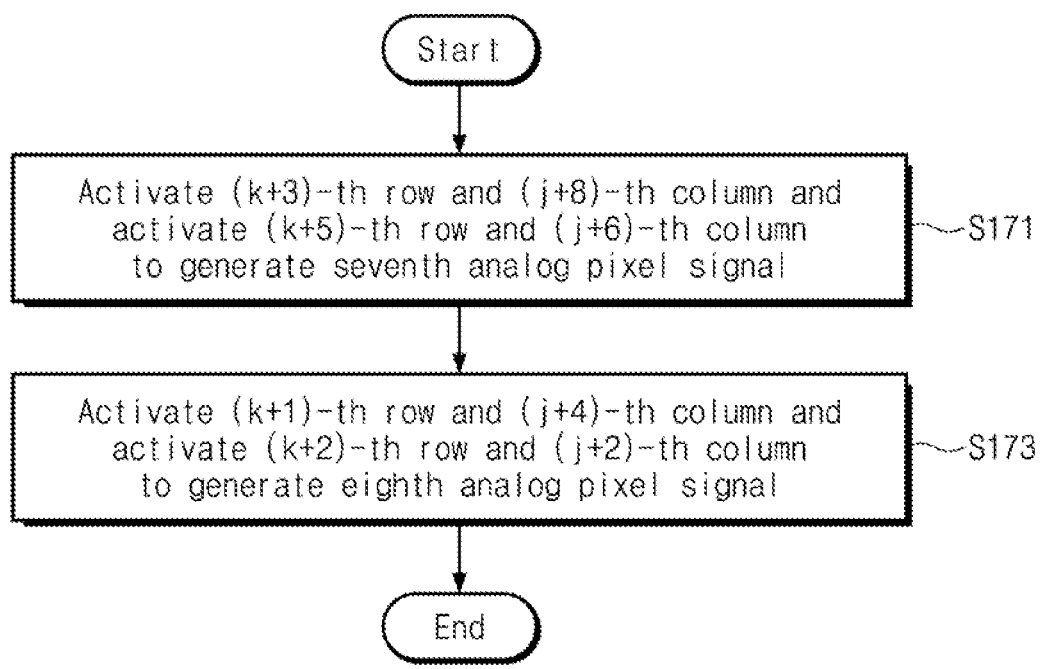
FIG. 15 is a flowchart illustrating an example of outputting analog image data corresponding to an operation shown in FIG. 12.

FIG. 15 is a flowchart illustrating an example of outputting analog image data corresponding to an operation shown in FIG. 12.

Referring to FIGS. 12 and 15, in the outputting of analog image data, the seventh analog pixel signal is generated (S171), and the eighth analog pixel signal is generated (S173).

According to an embodiment, the seventh analog pixel signal may be generated by activating the (k+3)-th row and the (j+8)-th column and the (k+5)-th row and the (j+6)-th column of the pixel array 110 described with reference to FIGS. 1 and 2. In this case, an analog signal corresponding to all photo charges integrated by photodiodes of pixels disposed at ((k+3), (j+8)) and ((k+5), (j+6)) of the pixel array 110 may be output as the seventh analog pixel signal.

According to an embodiment, the eighth analog pixel signal may be generated by activating the (k+1)-th row and the (j+4)-th column of the pixel array 110 and activating the (k+3)-th row and the (j+2)-th column of the pixel array 110. In this case, an analog signal corresponding to all photo charges integrated by photodiodes of pixels disposed at ((k+1), (j+4)) and ((k+3), (j+2)) of the pixel array 110 may be output as the eighth analog pixel signal.

According to an embodiment, when the pixels included in the pixel array 110 are arranged in the RGBW non-Bayer pattern, the seventh analog pixel signal may correspond to a blue pixel based on the red pixels at ((k+1), (j+4) and (k+3), (j+4)) and, and the eighth analog pixel signal may correspond to a red pixel based on the red pixels at ((k+3), (j+6) and (k+5), (j+6)).

Figure 16A:
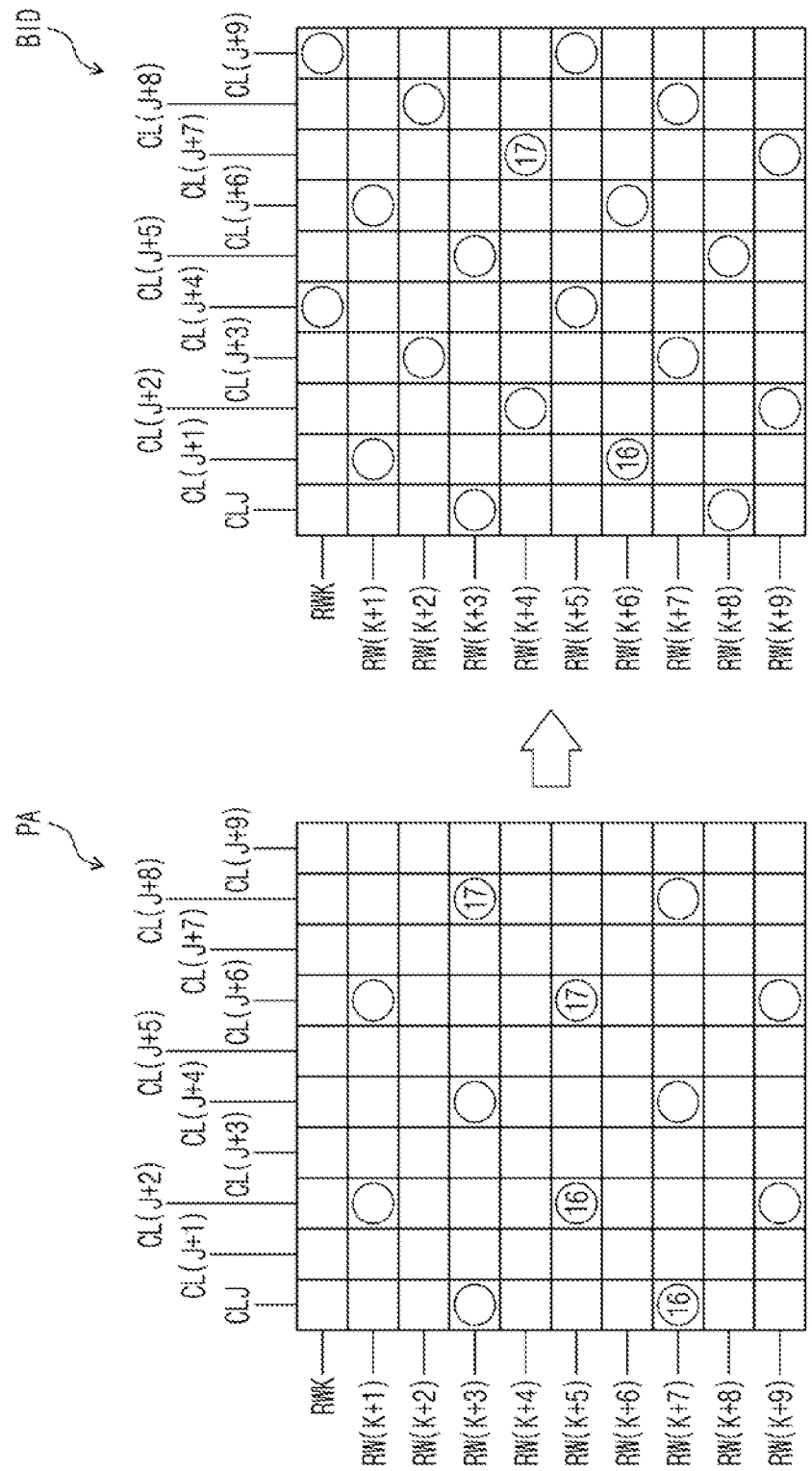
FIGS. 16A and 16B are diagrams for describing a method of generating binning image data from pixels arranged in a second pattern shown in FIG. 11, according to an embodiment.
Figure 16B:
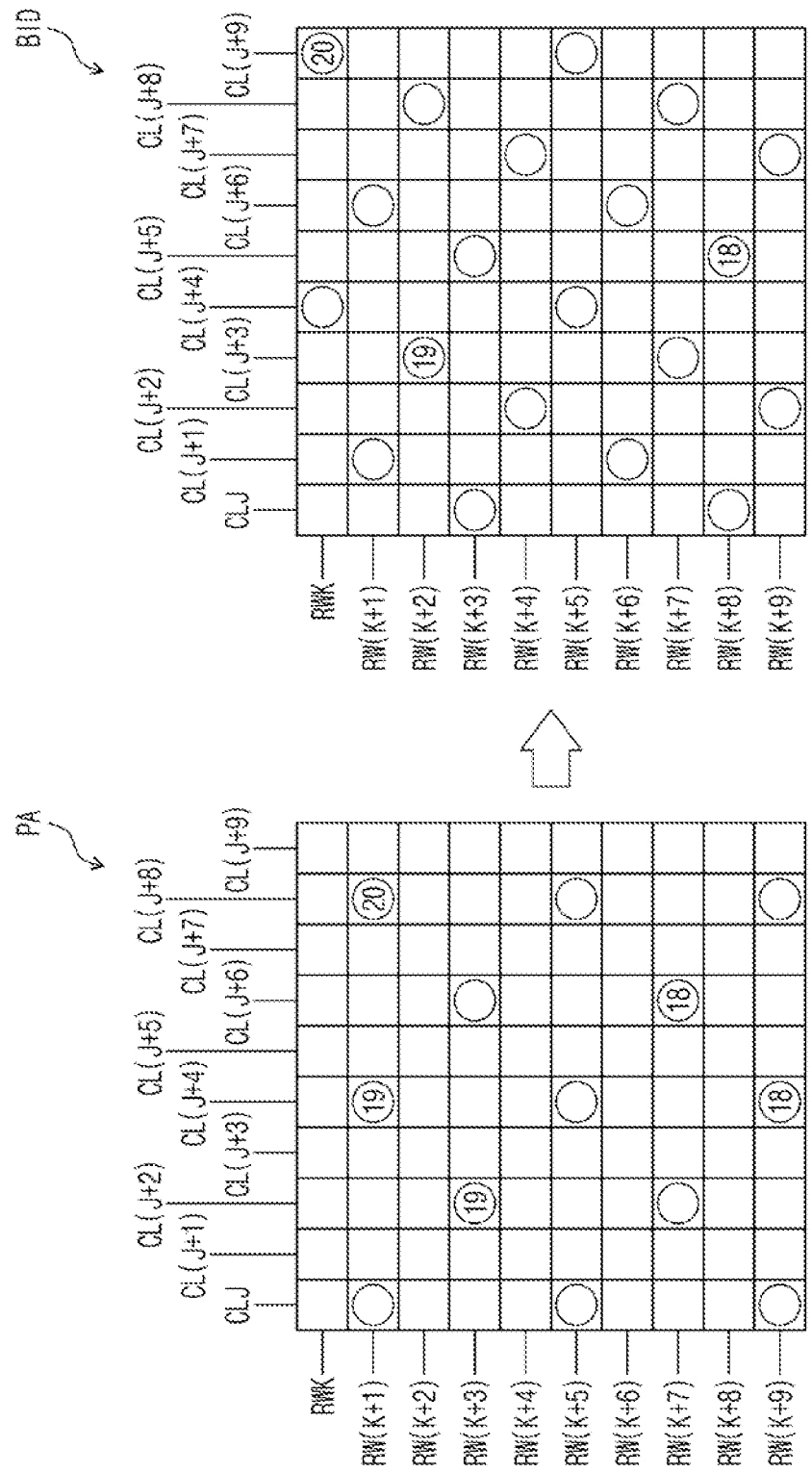

FIGS. 16A and 16B are diagrams for describing a method of generating binning image data from pixels arranged in a second pattern shown in FIG. 11, according to an embodiment.

In FIGS. 16A and 16B, for convenience of description, only pixels included in the unit pixel group described with reference to FIG. 1 are illustrated in the pixel array PA. In FIGS. 16A and 16B, only binning sampling signals generated from the unit pixel group are illustrated in a binning image data BID. When the pixels are arranged in the RGBW non-Bayer pattern, only blue pixels are marked by a circle in FIG. 16A, and only red pixels are marked by a circle in FIG. 16B.

Referring to FIG. 16A, a binning sampling signal marked by number "16" may be generated based on blue pixels marked by number "16". As in the above description, binning sampling signals marked by number "17" may be generated.

Referring to FIG. 16B, a binning sampling signal marked by number "18" may be generated based on red pixels marked by number "18". As in the above description, binning sampling signals marked by numbers "19" and "20" may be generated.

Like all the binning sampling signals included in the binning image data BID illustrated in FIGS. 14A, 14B, 14C, and 14D, the binning sampling signals included in the binning image data BID illustrated in FIGS. 14A, 14B, 16A, and 16B may be generated as illustrated in FIG. 14E.

Figure 17:
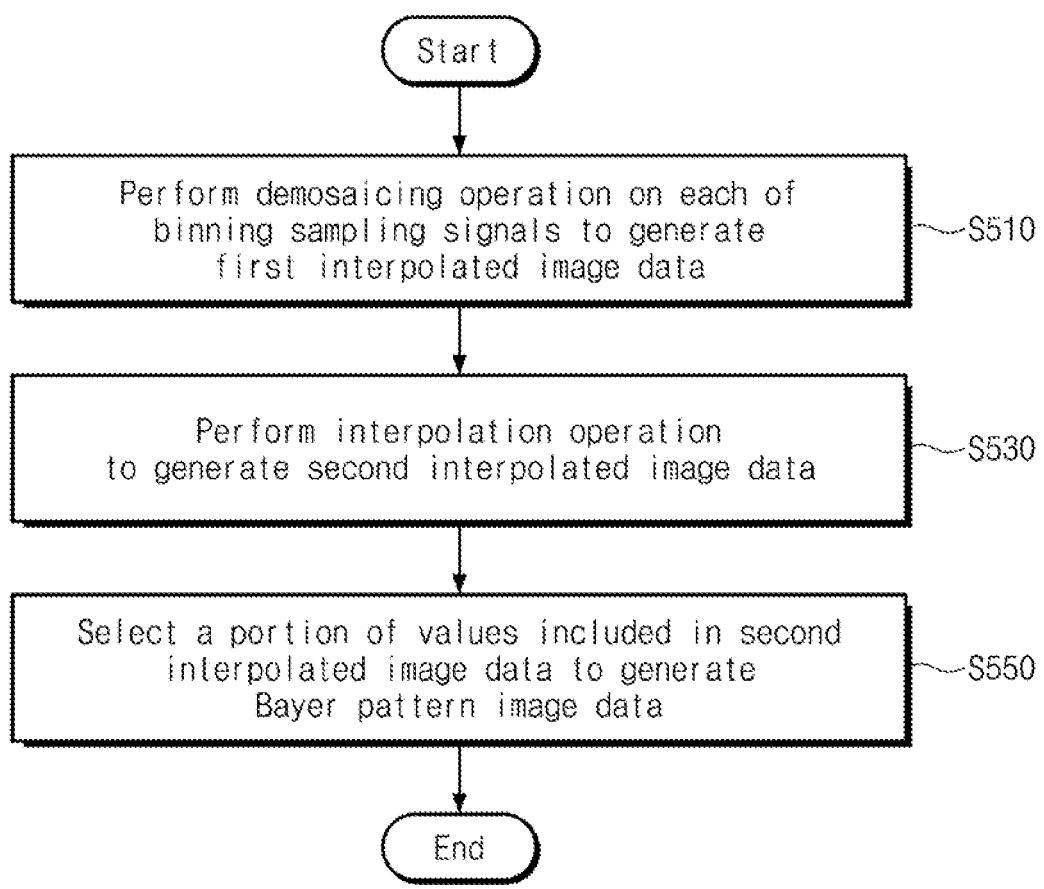
FIG. 17 is a flowchart illustrating an example of outputting Bayer pattern image data corresponding to an operation shown in FIG. 1.

FIG. 17 is a flowchart illustrating an example of outputting Bayer pattern image data corresponding to an operation shown in FIG. 1.

Referring to FIGS. 1 and 17, in outputting o Bayer pattern image data, first interpolated image data are generated (S510).

According to an embodiment, the first interpolated image data may be generated by performing a demosaicking operation on each of binning sampling signals included in binning image data. For example, in addition to a corresponding color component (e.g., a green color), any other color components (e.g., a red color and a blue color) may be added to each of the binning sampling signals.

Second interpolated image data are generated (S530).

According to an embodiment, the second interpolated image data may be generated by performing an interpolation operation of filling empty data regions of the first interpolated image data.

Bayer pattern image data are generated (S550).

According to an embodiment, the Bayer pattern image data may be generated by selecting some of digital values included in the second interpolated image data.

Figure 18:
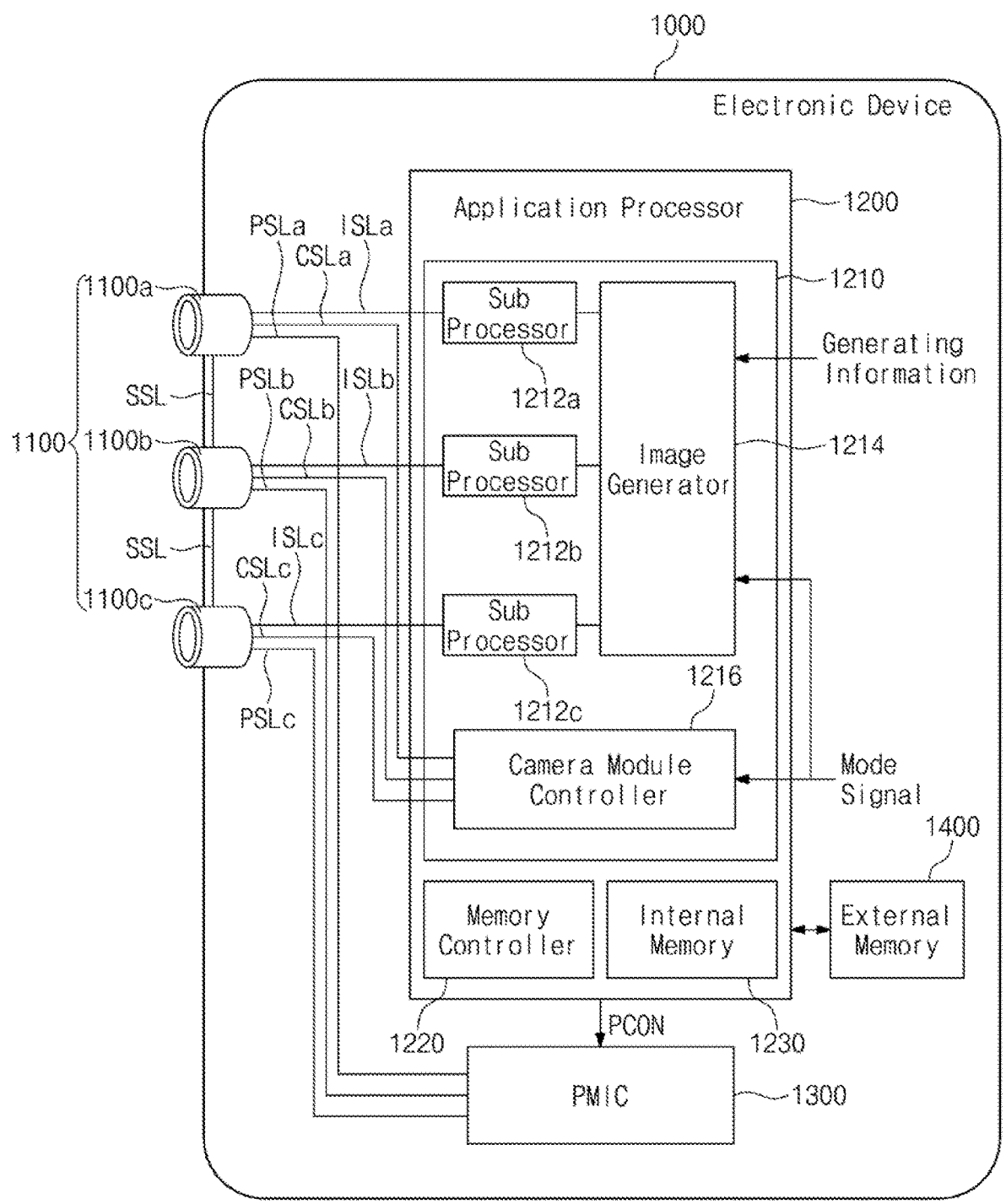
FIG. 18 is a block diagram of an electronic device including a multi-camera module.
Figure 19:
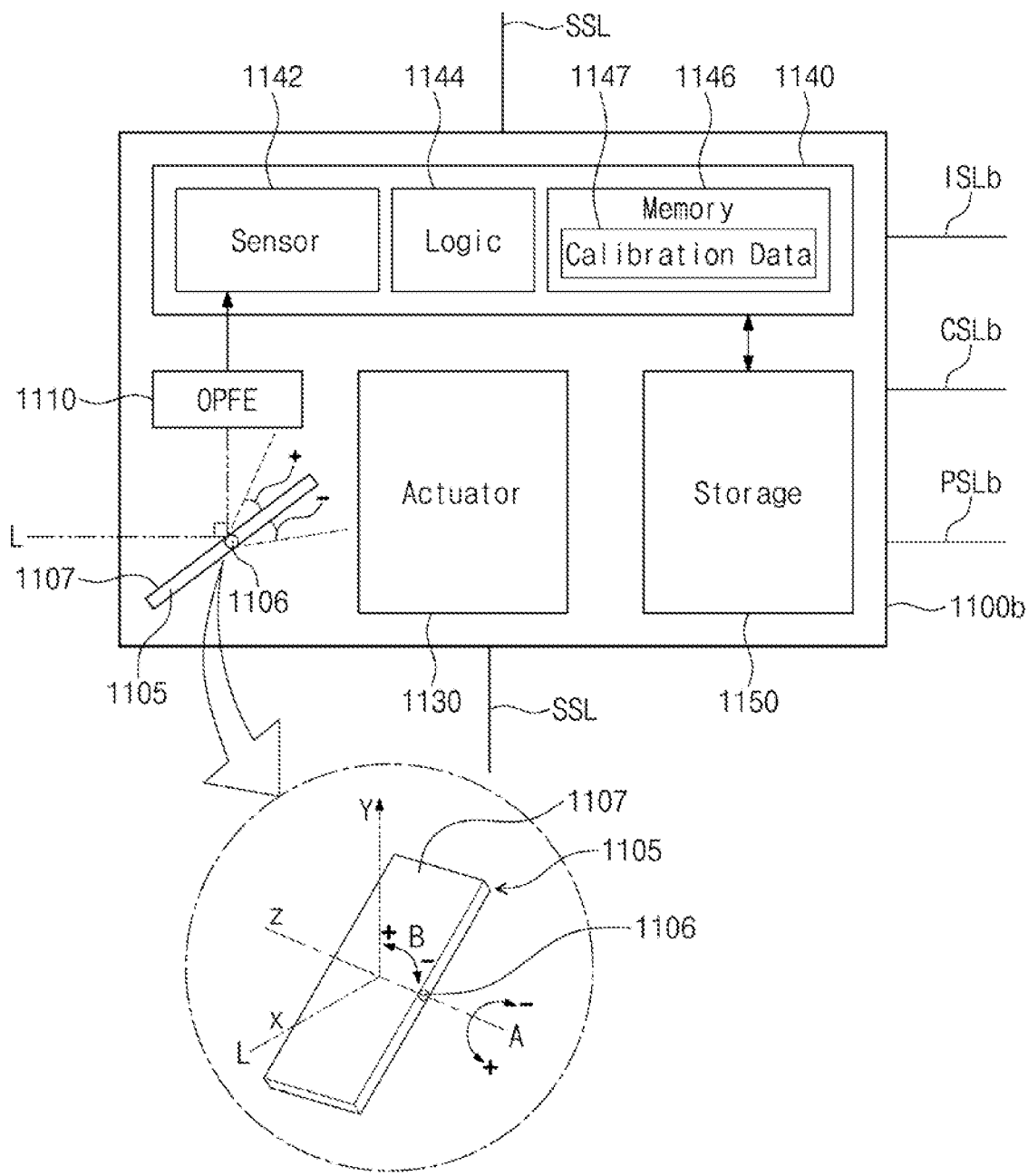
FIG. 19 is a block diagram illustrating a camera module of FIG. 18.

FIG. 18 is a block diagram of an electronic device including a multi-camera module. FIG. 19 is a block diagram illustrating a camera module of FIG. 18.

Referring to FIG. 18, an electronic device 1000 may include a camera module group 1100, an application processor 1200, a power management integrated circuit (PMIC) 1300, and an external memory 1400.

The camera module group 1100 may include a plurality of camera modules 1100a, 1100b, and 1100c. An electronic device including three camera modules 1100a, 1100b, and 1100c is illustrated in FIG. 18, but the present disclosure is not limited thereto. In some embodiments, the camera module group 1100 may be modified to include only two camera modules. Also, in some embodiments, the camera module group 1100 may be modified to include "n" camera modules (n being a natural number of 4 or more).

Below, a detailed configuration of the camera module 1100b will be more fully described with reference to FIG. 19, but the following description may be equally applied to the remaining camera modules 1100a and 1100c.

Referring to FIG. 19, the camera module 1100b may include a prism 1105, an optical path folding element (OPFE) 1110, an actuator 1130, an image sensing device 1140, and storage 1150.

The prism 1105 may include a reflecting plane 1107 of a light reflecting material, and may change a path of a light "L" incident from the outside.

In some embodiments, the prism 1105 may change a path of the light "L" incident in a first direction (X) to a second direction (Y) perpendicular to the first direction (X), Also, the prism 1105 may change the path of the light "L" incident in the first direction (X) to the second direction (Y) perpendicular to the first (X-axis) direction by rotating the reflecting plane 1107 of the light reflecting material in direction "A" about a central axis 1106 or rotating the central axis 1106 in direction "B". In this case, the OPFE 1110 may move in a third direction (Z) perpendicular to the first direction (X) and the second direction (Y).

In some embodiments, as illustrated, a maximum rotation angle of the prism 1105 in direction "A" may be equal to or smaller than 15 degrees in a positive A direction and may be greater than 15 degrees in a negative A direction, but the present disclosure is not limited thereto.

In some embodiments, the prism 1105 may move within approximately 20 degrees in a positive or negative B direction, between 10 degrees and 20 degrees, or between 15 degrees and 20 degrees. Here, the prism 1105 may move at the same angle in the positive or negative B direction or may move at a similar angle within approximately 1 degree.

In some embodiments, the prism 1105 may move the reflecting plane 1107 of the light reflecting material in the third direction (e.g., Z direction) parallel to a direction in which the central axis 1106 extends.

The OPFE 1110 may include optical lenses composed of "m" groups (m being a natural number), for example. Here, "m" lens may move in the second direction (Y) to change an optical zoom ratio of the camera module 1100b. For example, when a default optical zoom ratio of the camera module 1100b is "Z", the optical zoom ratio of the camera module 1100b may be changed to an optical zoom ratio of 3Z, 5Z, or 5Z or more by moving "m" optical lens included in the OPFE 1110.

The actuator 1130 may move the OPFE 1110 or an optical lens (hereinafter referred to as an "optical lens") to a specific location. For example, the actuator 1130 may adjust a location of an optical lens such that an image sensor 1142 is placed at a focal length of the optical lens for accurate sensing.

The image sensing device 1140 may include the image sensor 1142, control logic 1144, and a memory 1146. The image sensor 1142 may sense an image of a sensing target by using the light "L" provided through an optical lens. The control logic 1144 may control overall operations of the camera module 1100b. For example, the control logic 1144 may control an operation of the camera module 1100b based on a control signal provided through a control signal line CSLb.

The memory 1146 may store information, which is necessary for an operation of the camera module 1100b, such as calibration data 1147. The calibration data 1147 may include information necessary for the camera module 1100b to generate image data by using the light "L" provided from the outside. The calibration data 1147 may include, for example, information about the degree of rotation described above, information about a focal length, information about an optical axis, etc. In the case where the camera module 1100b is implemented in the form of a multi-state camera in which a focal length varies depending on a location of an optical lens, the calibration data 1147 may include a focal length value for each location (or state) of the optical lens and information about auto focusing.

The image sensor 1142 may correspond to a configuration including the pixel array 110, the correlated double sampling (CDS) block 140, the counter block 150, the ramp signal generator 160, the driver/address decoder 130, and the digital signal processing circuit 170 described with reference to FIG. 2, and the control logic 1144 may correspond to the control circuit 120 described with reference to FIG. 2.

The storage 1150 may store image data sensed through the image sensor 1142. The storage 1150 may be disposed outside the image sensing device 1140 and may be implemented in a shape where the storage 1150 and a sensor chip constituting the image sensing device 1140 are stacked. In some embodiments, the storage 1150 may be implemented with an electrically erasable programmable read only memory (EEPROM), but the present disclosure is not limited thereto.

Referring together to FIGS. 18 and 19, in some embodiments, each of the plurality of camera modules 1100a, 1100b, and 1100c may include the actuator 1130. As such, the same calibration data 1147 or different calibration data 1147 may be included in the plurality of camera modules 1100a, 1100b, and 1100c depending on operations of the actuators 1130 therein.

In some embodiments, one camera module (e.g., 1100b) among the plurality of camera modules 1100a, 1100b, and 1100c may be a folded lens shape of camera module in which the prism 1105 and the OPFE 1110 described above are included, and the remaining camera modules (e.g., 1100a and 1100c) may be a vertical shape of camera module in which the prism 1105 and the OPFE 1110 described above are not included; however, the present disclosure is not limited thereto.

In some embodiments, one camera module (e.g., 1100c) among the plurality of camera modules 1100a, 1100b, and 1100c may be, for example, a vertical shape of depth camera extracting depth information by using an infrared ray (IR). In this case, the application processor 1200 may merge image data provided from the depth camera and image data provided from any other camera module (e.g., 1100a or 1100b) and may generate a three-dimensional (3D) depth image.

In some embodiments, at least two camera modules (e.g., 1100a and 1100b) among the plurality of camera modules 1100a, 1100b, and 1100c may have different fields of view. In this case, the at least two camera modules (e.g., 1100a and 1100b) among the plurality of camera modules 1100a, 1100b, and 1100c may include different optical lens, but the present disclosure is not limited thereto.

Also, in some embodiments, fields of view of the plurality of camera modules 1100a, 1100b, and 1100c may be different. In this case, the plurality of camera modules 1100a, 1100b, and 1100c may include different optical lens, not limited thereto.

In some embodiments, the plurality of camera modules 1100a, 1100b, and 1100c may be disposed to be physically separated from each other. That is, the plurality of camera modules 1100a, 1100b, and 1100c may not use a sensing area of one image sensor 1142, but the plurality of camera modules 1100a, 1100b, and 1100c may include independent image sensors 1142 therein, respectively.

Returning to FIG. 18, the application processor 1200 may include an image processing device 1210, a memory controller 1220, and an internal memory 1230. The application processor 1200 may be implemented to be separated from the plurality of camera modules 1100a, 1100b, and 1100c. For example, the application processor 1200 and the plurality of camera modules 1100a, 1100b, and 1100c may be implemented with separate semiconductor chips.

The image processing device 1210 may include a plurality of sub image processors 1212a, 1212b, and 1212c, an image generator 1214, and a camera module controller 1216.

The image processing device 1210 may include the plurality of sub image processors 1212a, 1212b, and 1212c, the number of which corresponds to the number of the plurality of camera modules 1100a, 1100b, and 1100c.

Image data respectively generated from the camera modules 1100a, 1100b, and 1100c may be respectively provided to the corresponding sub image processors 1212a, 1212b, and 1212c through separated image signal lines ISLa, ISLb, and ISLc. For example, the image data generated from the camera module 1100a may be provided to the sub image processor 1212a through the image signal line ISLa, the image data generated from the camera module 1100b may be provided to the sub image processor 1212b through the image signal line ISLb, and the image data generated from the camera module 1100c may be provided to the sub image processor 1212c through the image signal line ISLc. This image data transmission may be performed, for example, by using a camera serial interface (CSI) based on the MIPI (Mobile Industry Processor Interface), but the present disclosure is not limited thereto.

Meanwhile, in some embodiments, one sub image processor may be disposed to correspond to a plurality of camera modules. For example, the sub image processor 1212a and the sub image processor 1212c may be integrally implemented, not separated from each other as illustrated in FIG. 18. In this case, one of the pieces of image data respectively provided from the camera module 1100a and the camera module 1100c may be selected through a selection element (e.g., a multiplexer), and the selected image data may be provided to the integrated sub image processor.

The image data respectively provided to the sub image processors 1212a, 1212b, and 1212c may be provided to the image generator 1214. The image generator 1214 may generate an output image by using the image data respectively provided from the sub image processors 1212a, 1212b, and 1212c, depending on image generating information Generating Information or a mode signal.

In detail, the image generator 1214 may generate the output image by merging at least a portion of the image data respectively generated from the camera modules 1100a, 1100b, and 1100c having different fields of view, depending on the image generating information Generating Information or the mode signal. Also, the image generator 1214 may generate the output image by selecting one of the image data respectively generated from the camera modules 1100a, 1100b, and 1100c having different fields of view, depending on the image generating information Generating Information or the mode signal.

In some embodiments, the image generating information Generating Information may include a zoom signal or a zoom factor. Also, in some embodiments, the mode signal may be, for example, a signal based on a mode selected from a user.

In the case where the image generating information Generating Information is the zoom signal (or zoom factor) and the camera modules 1100a, 1100b, and 1100c have different visual fields of view, the image generator 1214 may perform different operations depending on a kind of the zoom signal. For example, in the case where the zoom signal is a first signal, the image generator 1214 may merge the image data output from the camera module 1100a and the image data output from the camera module 1100c and may generate the output image by using the merged image signal and the image data output from the camera module 1100b that is not used in the merging operation. In the case where the zoom signal is a second signal different from the first signal, without the image data merging operation, the image generator 1214 may select one of the image data respectively output from the camera modules 1100a, 1100b, and 1100c and may output the selected image data as the output image. However, the present disclosure is not limited thereto, and a way to process image data may be modified without limitation if necessary.

In some embodiments, the image generator 1214 may generate merged image data having an increased dynamic range by receiving a plurality of image data of different exposure times from at least one of the plurality of sub image processors 1212a, 1212b, and 1212c and performing high dynamic range (HDR) processing on the plurality of image data.

The camera module controller 1216 may provide control signals to the camera modules 1100a, 1100b, and 1100c, respectively. The control signals generated from the camera module controller 1216 may be respectively provided to the corresponding camera modules 1100a, 1100b, and 1100c through control signal lines CSLa, CSLb, and CSLc separated from each other.

One of the plurality of camera modules 1100a, 1100b, and 1100c may be designated as a master camera (e.g., 1100b) depending on the image generating information Generating Information including a zoom signal or the mode signal, and the remaining camera modules (e.g., 1100a and 1100c) may be designated as a slave camera. The above designation information may be included in the control signals, and the control signals including the designation information may be respectively provided to the corresponding camera modules 1100a, 1100b, and 1100c through the control signal lines CSLa, CSLb, and CSLc separated from each other.

Camera modules operating as a master and a slave may be changed depending on the zoom factor or an operating mode signal. For example, in the case where the field of view of the camera module 1100a is wider than the field of view of the camera module 1100b and the zoom factor indicates a low zoom ratio, the camera module 1100b may operate as a master, and the camera module 1100a may operate as a slave. In contrast, in the case where the zoom factor indicates a high zoom ratio, the camera module 1100a may operate as a master, and the camera module 1100b may operate as a slave.

In some embodiments, the control signal provided from the camera module controller 1216 to each of the camera modules 1100a, 1100b, and 1100c may include a sync enable signal. For example, in the case where the camera module 1100b is used as a master camera and the camera modules 1100a and 1100c are used as a slave camera, the camera module controller 1216 may transmit the sync enable signal to the camera module 1100b. The camera module 1100b that is provided with sync enable signal may generate a sync signal based on the provided sync enable signal and may provide the generated sync signal to the camera modules 1100a and 1100c through a sync signal line SSL. The camera module 1100b and the camera modules 1100a and 1100c may be synchronized with the sync signal to transmit image data to the application processor 1200.

In some embodiments, the control signal provided from the camera module controller 1216 to each of the camera modules 1100a, 1100b, and 1100c may include mode information according to the mode signal. Based on the mode information, the plurality of camera modules 1100a, 1100b, and 1100c may operate in a first operating mode and a second operating mode with regard to a sensing speed.

In the first operating mode, the plurality of camera modules 1100a, 1100b, and 1100c may generate image signals at a first speed (e.g., may generate image signals of a first frame rate), may encode the image signals at a second speed (e.g., may encode the image signal of a second frame rate higher than the first frame rate), and transmit the encoded image signals to the application processor 1200. In this case, the second speed may be 30 times or less the first speed.

According to an embodiment, the encoded image signal may correspond to the Bayer pattern image data described with reference to FIG. 1.

The application processor 1200 may store the received image signals, that is, the encoded image signals in the internal memory 1230 provided therein or the external memory 1400 placed outside the application processor 1200. Afterwards, the application processor 1200 may read and decode the encoded image signals from the internal memory 1230 or the external memory 1400 and may display image data generated based on the decoded image signals. For example, the corresponding one among sub image processors 1212*a*, 1212*b*, and 1212*c* of the image processing device 1210 may perform decoding and may also perform image processing on the decoded image signal.

In the second operating mode, the plurality of camera modules 1100*a*, 1100*b*, and 1100*c* may generate image signals at a third speed (e.g., may generate image signals of a third frame rate lower than the first frame rate) and transmit the image signals to the application processor 1200. The image signals provided to the application processor 1200 may be signals that are not encoded. The application processor 1200 may perform image processing on the received image signals or may store the image signals in the internal memory 1230 or the external memory 1400.

The PMIC 1300 may supply powers, for example, power supply voltages to the plurality of camera modules 1100*a*, 1100*b*, and 1100*c*, respectively. For example, under control of the application processor 1200, the PMIC 1300 may supply a first power to the camera module 1100*a* through a power signal line PSLa, may supply a second power to the camera module 1100*b* through a power signal line PSLb, and may supply a third power to the camera module 1100*c* through a power signal line PSLc.

In response to a power control signal PCON from the application processor 1200, the PMIC 1300 may generate a power corresponding to each of the plurality of camera modules 1100*a*, 1100*b*, and 1100*c* and may adjust a level of the power. The power control signal PCON may include a power adjustment signal for each operating mode of the plurality of camera modules 1100*a*, 1100*b*, and 1100*c*. For example, the operating mode may include a low-power mode. In this case, the power control signal PCON may include information about a camera module operating in the low-power mode and a set power level. Levels of the powers respectively provided to the plurality of camera modules 1100*a*, 1100*b*, and 1100*c* may be identical to each other or may be different from each other. Also, a level of a power may be dynamically changed.

A method of binning an image sensor and the image sensor according to the above embodiments may effectively improve the quality of digital image data that the image sensor generates, by removing the jagging artifact capable of occurring due to the binning and decreasing the number of false colors.

As is traditional in the field, the embodiments are described, and illustrated in the drawings such as FIGS. 2, 18 and 19, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. In embodiments, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion While the present disclosure has been described with reference to embodiments thereof, it will be apparent to those of ordinary skill in the art that various changes and modifications may be made thereto without departing from the spirit and scope of the disclosure as set forth in the following claims.

What is claimed is:

1. A method of binning an image sensor, the method comprising:
    outputting analog pixel signals by performing binning on a pixel array comprising a plurality of pixels having a first matrix shape and arranged in a row direction and a column direction repeatedly at a first interval;
    outputting binning image data comprising binning sampling signals having a second matrix shape, in which the first matrix shape is rotated by a given angle, and arranged repeatedly at a second interval different from the first interval, based on the analog pixel signals; and
    outputting Bayer pattern image data having the first matrix shape, based on the binning image data.

2. The method of claim 1, wherein the outputting the analog image pixel signals comprises:
    activating a k-th row (k being an integer of 2 or more), a (k+2)-th row, a j-th column (j being an integer of 2 or more), and a (j+2)-th column of the pixel array to generate a first analog pixel signal; and
    activating the (k+2)-th row, a (k+4)-th row, a (j+4)-th column, and a (j+6)-th column of the pixel array to generate a second analog pixel signal.

3. The method of claim 2, wherein the plurality of pixels comprise green pixels, and
    wherein the first analog pixel signal and the second analog pixel signal correspond to the green pixels.

4. The method of claim 2, wherein the outputting the binning image data comprises:
    generating a first binning sampling signal disposed at a (k+1)-th row and a (j+1)-th column of the binning image data, based on the first analog pixel signal; and
    generating a second binning sampling signal disposed at a (k+3)-th row and a (j+5)-th column of the binning image data, based on the second analog pixel signal.

5. The method of claim 1, wherein the outputting the analog image pixel signals comprises:
    activating a k-th row, a (k+2)-th row, a j-th column, and a (j+2)-th column of the pixel array to generate a first analog pixel signal;

activating a (k+1)-th row, a (k+3)-th row, the (j+2)-th column, and a (j+4)-th column of the pixel array to generate a second analog pixel signal;

activating the (k+2)-th row, a (k+4)-th row, a (j−1)-th column, and a (j+1)-th column of the pixel array to generate a third analog pixel signal; and activating the (k+1)-th row, the (k+3)-th row, a (j+3)-th column, and a (j+5)-th column of the pixel array to generate a fourth analog pixel signal.

6. The method of claim 5, wherein the plurality of pixels comprise green pixels, blue pixels, and red pixels, and wherein the first analog pixel signal and the fourth analog pixel signal correspond to the green pixels, the second analog pixel signal corresponds to the blue pixels, and the third analog pixel signal corresponds to the red pixels.

7. The method of claim 5, wherein the outputting of the binning image data comprises:

generating a first binning sampling signal disposed at a (k+1)-th row and a (j+1)-th column of the binning image data, based on the first analog pixel signal;

generating a second binning sampling signal disposed at a (k+2)-th row and a (j+3)-th column of the binning image data, based on the second analog pixel signal;

generating a third binning sampling signal disposed at a (k+3)-th row and the j-th column of the binning image data, based on the third analog pixel signal; and generating a fourth binning sampling signal disposed at the (k+2)-th row and a (j+4)-th column of the binning image data, based on the fourth analog pixel signal.

8. The method of claim 7, wherein the plurality of pixels comprise green pixels, blue pixels, and red pixels, and wherein the first binning sampling signal and the fourth binning sampling signal correspond to the green pixels, the second binning sampling signal corresponds to the blue pixels, and the third binning sampling signal corresponds to the red pixels.

9. The method of claim 1, wherein the outputting of the analog image pixel signals comprises:

activating a k-th row, a (k+2)-th row, a j-th column, and a (j+2)-th column of the pixel array to generate a first analog pixel signal;

activating the (k+2)-th row, a (k+4)-th row, a (j+4)-th column, and a (j+6)-th column of the pixel array to generate a second analog pixel signal;

activating a (k+3)-th row, a (k+5)-th row, a (j+1)-th column, and a (j+3)-th column of the pixel array to generate a third analog pixel signal; and activating the (k+5)-th row, a (k+7)-th row, a (j+5)-th column, and a (j+7)-th column of the pixel array to generate a fourth analog pixel signal.

10. The method of claim 9, wherein the outputting the analog image pixel signals further comprises:

activating the (k+2)-th row, the (k+4)-th row, a (j−1)-th column, and the (j+1)-th column of the pixel array to generate a fifth analog pixel signal; and activating the (k+4)-th row, a (k+6)-th row, the (j+4)-th column, and the (j+6)-th column of the pixel array to generate a sixth analog pixel signal.

11. The method of claim 10, wherein the outputting the analog image pixel signals further comprises:

activating a (k+1)-th row and the (j+2)-th column of the pixel array and activating the (k+3)-th row and the (j+4)-th column of the pixel array to generate a seventh analog pixel signal; and activating the (k+3)-th row and the (j+6)-th column of the pixel array and activating the (k+5)-th row and a (j+8)-th column of the pixel array to generate an eighth analog pixel signal.

12. The method of claim 11, wherein the plurality of pixels comprise green pixels, blue pixels, red pixels, and white pixels, and wherein the first to fourth analog pixel signals correspond to the white pixels, the fifth and sixth analog pixel signals correspond to the green pixels, the seventh analog pixel signal corresponds to the blue pixels, and the eighth analog pixel signal corresponds to the red pixels.

13. The method of claim 10, wherein the outputting the binning image data comprises:

outputting a first binning sampling signal disposed at a (k+1)-th row and a (j+1)-th column of the binning image data, based on the first analog pixel signal;

outputting a second binning sampling signal disposed at a (k+3)-th row and a (j+5)-th column of the binning image data, based on the second analog pixel signal;

outputting a third binning sampling signal disposed at a (k+4)-th row and a (j+2)-th column of the binning image data, based on the third analog pixel signal; and outputting a fourth binning sampling signal disposed at a (k+6)-th row and a (j+6)-th column of the binning image data, based on the fourth analog pixel signal.

14. The method of claim 10, wherein the outputting the analog image pixel signals further comprises:

activating the (k+3)-th row and a (j+8)-th column of the pixel array and activating the (k+5)-th row and the (j+6)-th column of the pixel array to generate a seventh analog pixel signal; and activating the (k+1)-th row and the (j+4)-th column of the pixel array and activating the (k+3)-th row and the (j+2)-th column of the pixel array to generate an eighth analog pixel signal.

15. The method of claim 1, wherein the outputting the Bayer pattern image data comprises:

performing a demosaicking operation on each of the binning sampling signals included in the binning image data to generate first interpolated image data;

performing an interpolation operation of filling empty data regions of the first interpolated image data to generate second interpolated image data; and selecting some of digital values included in the second interpolated image data to generate the Bayer pattern image data.

16. An image sensor comprising:

a pixel array comprising a plurality of pixels having a first matrix shape and arranged in a row direction and a column direction repeatedly at a first interval, and configured to output analog pixel signals by performing binning on the plurality of pixels;

a counter block configured to output binning image data comprising binning sampling signals having a second matrix shape, in which the first matrix shape is rotated by a given angle, and arranged repeatedly at a second interval different from the first interval, based on the analog pixel signals; and a digital signal processing circuit configured to output Bayer pattern image data having the first matrix shape based on the binning image data.

17. The image sensor of claim 16, wherein the plurality of pixels arranged in one of an RGB Bayer pattern and an RGBW non-Bayer pattern.

18. The image sensor of claim 16, wherein the second interval corresponds to $5^{(1/2)}$ times the first interval.

19. The image sensor of claim 16, wherein the second matrix shape comprises a shape in which the first matrix shape is rotated clockwise by $\tan^{-1}(1/2)$.

20. A method of binning an image sensor, the method comprising:
- outputting analog pixel signals by performing binning on a pixel array comprising a plurality of pixels having a first matrix shape and arranged in a row direction and a column direction repeatedly at a first interval;
- outputting binning image data comprising binning sampling signals having a second matrix shape, in which the first matrix shape is rotated by a given angle, and arranged repeatedly at a second interval different from the first interval, based on the analog pixel signals; and
- outputting Bayer pattern image data having the first matrix shape, based on the binning image data,
- wherein the outputting the analog image pixel signals comprises activating a k-th row (k being an integer of 2 or more), a (k+2)-th row, a j-th column (j being an integer of 2 or more), and a (j+2)-th column of the pixel array to generate a first analog pixel signal,
- wherein the outputting the binning image data comprises generating a first binning sampling signal disposed at a (k+1)-th row and a (j+1)-th column of the binning image data, based on the first analog pixel signal, and
- wherein the second matrix shape comprises a shape in which the first matrix shape is rotated clockwise by $\tan^{-1}(1/2)$.

* * * * *